(12) United States Patent
Lin et al.

(10) Patent No.: US 9,511,347 B2
(45) Date of Patent: Dec. 6, 2016

(54) HYDROCARBON OIL DESULFURIZATION ADSORBING AGENT, PRODUCTION AND USE THEREOF

(75) Inventors: Wei Lin, Beijing (CN); Huiping Tian, Beijing (CN); Zhenbo Wang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 318 days.

(21) Appl. No.: 14/235,037

(22) PCT Filed: Jul. 27, 2012

(86) PCT No.: PCT/CN2012/001004
§ 371 (c)(1),
(2), (4) Date: Mar. 12, 2014

(87) PCT Pub. No.: WO2013/013507
PCT Pub. Date: Jan. 31, 2013

(65) Prior Publication Data
US 2014/0190871 A1 Jul. 10, 2014

(30) Foreign Application Priority Data

Jul. 28, 2011 (CN) .......................... 2011 1 0213169
Jul. 28, 2011 (CN) .......................... 2011 1 0213184
Jul. 28, 2011 (CN) .......................... 2011 1 0213242
Jul. 28, 2011 (CN) .......................... 2011 1 0213256

(51) Int. Cl.
*B01J 20/18* (2006.01)
*C10G 45/12* (2006.01)
*C10G 25/05* (2006.01)
*B01J 29/06* (2006.01)
*B01J 29/072* (2006.01)
*B01J 20/30* (2006.01)
*B01J 20/32* (2006.01)
*B01J 20/06* (2006.01)
*B01J 20/28* (2006.01)
*B01J 20/02* (2006.01)
*B01J 20/10* (2006.01)

(52) U.S. Cl.
CPC ............ *B01J 20/18* (2013.01); *B01J 20/0222* (2013.01); *B01J 20/0225* (2013.01); *B01J 20/06* (2013.01); *B01J 20/103* (2013.01); *B01J 20/2803* (2013.01); *B01J 20/3007* (2013.01); *B01J 20/3042* (2013.01); *B01J 20/3078* (2013.01); *B01J 20/3085* (2013.01); *B01J 20/3204* (2013.01); *B01J 20/3236* (2013.01); *B01J 29/061* (2013.01); *B01J 29/072* (2013.01); *C10G 25/05* (2013.01); *C10G 45/12* (2013.01); *C10G 2300/202* (2013.01)

(58) Field of Classification Search
CPC ......................................................... B01J 20/18
See application file for complete search history.

(56) References Cited

U.S. PATENT DOCUMENTS

| 6,150,300 | A  | 11/2000 | Khare et al.   |
|-----------|----|---------|----------------|
| 6,254,766 | B1 | 7/2001  | Sughrue et al. |
| 6,346,190 | B1 | 2/2002  | Khare          |
| 6,350,422 | B1 | 2/2002  | Khare et al.   |
| 6,428,685 | B2 | 8/2002  | Khare          |
| 6,429,170 | B1 | 8/2002  | Dodwell        |
| 6,482,314 | B1 | 11/2002 | Khare          |
| 6,955,752 | B2 | 10/2005 | Dodwell        |

FOREIGN PATENT DOCUMENTS

| CN | 1151333 A    |   | 6/1997  |              |
|----|--------------|---|---------|--------------|
| CN | 1355727 A    |   | 6/2002  |              |
| CN | 101481627 A  |   | 7/2009  |              |
| CN | 102114406 A  |   | 7/2011  |              |
| CN | 102114407 A  |   | 7/2011  |              |
| CN | 102294224 A  |   | 12/2011 |              |
| CN | 102294225 A  |   | 12/2011 |              |
| CN | 101481627 B  | * | 11/2012 | ............ C10G 25/03 |
| CN | 102895940 A  |   | 1/2013  |              |
| CN | 102895944 A  |   | 1/2013  |              |
| CN | 102895945 A  |   | 1/2013  |              |
| CN | 102895948 A  |   | 1/2013  |              |
| RU | 2230608 C2   |   | 6/2004  |              |
| RU | 2264855 C2   |   | 11/2005 |              |
| RU | 2335528 C2   |   | 10/2008 |              |
| WO | 01/14052 A1  |   | 3/2001  |              |
| WO | 2005/019386 A1 |   | 3/2005  |            |

* cited by examiner

*Primary Examiner* — Brian McCaig
(74) *Attorney, Agent, or Firm* — Novick, Kim & Lee, PLLC; Allen Xue

(57) ABSTRACT

This disclosure provides an adsorbing agent which, on the basis of the total weight of the adsorbing agent, comprises the following components: 1) a Si—Al molecular sieve having a BEA structure, in an amount of 1-20 wt %, 2) at least one binder selected from the group consisting of titanium dioxide, stannic oxide, zirconium oxide and alumina, in an amount of 3-35 wt %, 3) a silica source, in an amount of 5-40 wt %, 4) zinc oxide, in an amount of 10-80 wt %, and 5) at least one promoter metal selected from the group consisting of cobalt, nickel, iron and manganese, based on the metal, in an amount of 5-30 wt %, wherein at least 10 wt % of the promoter metal is present in a reduced valence state. The adsorbing agent exhibits improved activity and stability, and at the same time, is capable of significantly improving the octane number of the product gasoline.

12 Claims, No Drawings

HYDROCARBON OIL DESULFURIZATION ADSORBING AGENT, PRODUCTION AND USE THEREOF

TECHNICAL FIELD

This invention relates to a desulfurization adsorbing agent. Specifically, this invention relates to a desulfurization adsorbing agent for hydrocarbon oil, production and use thereof.

BACKGROUND ARTS

The Chinese patent application No. CN1355727A relates to an adsorbing composition comprising zinc oxide, silica, alumina and nickel or cobalt, and a process for producing this adsorbing composition. According to this process, a carrier containing zinc oxide, silica, and alumina is firstly produced, and then nickel is introduced thereto by an impregnation method. This adsorbing composition can be used in removing sulfur from a fcc gasoline or a diesel fuel.

According to the Chinese patent laid open No. CN1208124C, a carrier for the adsorbing agent comprising zinc oxide, expanded perlite, and alumina is impregnated with a promoter metal like cobalt and nickel, and then at a suitable temperature, the promoter is reduced, so as to obtain an adsorbing agent for use in removing sulfides from a fcc gasoline.

The prior art adsorbing agents, when used under a hydrogen atmosphere for removing sulfur from gasoline, it is unavoidable to reduce the octane number due to saturation of olefins.

The Chinese patent application No. CN101433821A mentions an adsorbing agent for removing sulfur from hydrocarbon oils, including a rare earth faujasite, an active metal oxide and a carrier, wherein the carrier includes alumina and zinc oxide, wherein the rare earth faujasite is previously mixed with the carrier and molded into porous solid particles, and then the active metal components are introduced into the porous solid particles, to obtain the adsorbing agent.

The Chinese patent application No. CN101434854A mentions an adsorbing agent for removing sulfur from light hydrocarbon oils, including a phosphorus modified rare earth faujasite, an active metal oxide and a carrier including alumina and zinc oxide, wherein a rare earth faujasite is previously modified by phosphorus, and then mixed with the carrier, and then molded into porous solid particles, and then the active metal components are introduced into the porous solid particles, to obtain the adsorbing agent.

The prior art adsorbing agents intend to increase the octane number of gasoline by comprising a shape selective molecular sieve in favor of isomerization, however, suffers from the problems of lacking a suitable amount of promoter metals and sulfur reservoirs, resulting in an adsorbing agent having an insufficient desulfurization activity.

In view of this, there still remains a need in the prior art for a desulfurization adsorbing agent, which exhibits a high desulfurization adsorbing activity, and at the same time, increases the octane number of the desulfurizated product.

Invention Summary

This invention has been developed specifically for solving these problems in the prior art, and relates to a desulfurization adsorbing agent for hydrocarbon oil, production and use thereof.

Specifically, this invention relates to the following aspects.

1. A desulfurization adsorbing agent for hydrocarbon oil, on the basis of the total weight of the adsorbing agent, comprising the following components,
   1) a Si—Al molecular sieve having a BEA structure, in an amount of 1-20 wt %,
   2) at least one binder selected from the group consisting of titanium dioxide, stannic oxide, zirconium oxide and alumina, in an amount of 3-35 wt %,
   3) a silica source, in an amount of 5-40 wt %,
   4) zinc oxide, in an amount of 10-80 wt %, and
   5) at least one promoter metal selected from the group consisting of cobalt, nickel, iron and manganese, based on the metal, in an amount of 5-30 wt %, wherein at least 10 wt % of the promoter metal is present in a reduced valence state.

2. The adsorbing agent according to any of the aforesaid aspects, wherein the Si—Al molecular sieve having a BEA structure is in an amount of 2-15 wt %, the binder is in an amount of 5-25 wt %, the silica source is in an amount of 10-30 wt %, the zinc oxide is in an amount of 25-70 wt %, the promoter metal is in an amount of 8-25 wt %.

3. The adsorbing agent according to any of the aforesaid aspects, wherein the Si—Al molecular sieve having a BEA structure is in an amount of 2-10 wt %, the binder is in an amount of 8-15 wt %, the silica source is in an amount of 12-25 wt %, the zinc oxide is in an amount of 40-60 wt %, the promoter metal is in an amount of 12-20 wt %.

4. The adsorbing agent according to any of the aforesaid aspects, wherein the silica source is selected from the group consisting of silica or a natural mineral having a silica content of more than 45 wt %.

5. The adsorbing agent according to any of the aforesaid aspects, wherein the Si—Al molecular sieve having a BEA structure is a Beta-molecular sieve.

6. A process for producing the desulfurization adsorbing agent for hydrocarbon oil according to any of the aforesaid aspects, including,
   (1) contacting at least one binder selected from the group consisting of titanium dioxide, stannic oxide, zirconium oxide and alumina with a silica source, a Si—Al molecular sieve having a BEA structure and zinc oxide, to obtain a carrier,
   (2) contacting the carrier with a promoter metal-containing compound, to obtain a precursor of the adsorbing agent, and
   (3) under a condition sufficient to present at least 10 wt % of the promoter metal in a reduced valence state (or to convert at least 10 wt % of the promoter metal into its reduced valence state), treating the precursor of the adsorbing agent, to obtain the desulfurization adsorbing agent for hydrocarbon oil.

7. The process according to any of the aforesaid aspects, wherein the step (1) includes the following steps,
   (1a) the binder or a binder precursor is mixed with an acid, to form a slurry, and
   (1b) the slurry, the silica source, the Si—Al molecular sieve having a BEA structure and zinc oxide are mixed together, and molded, dried and calcinated, to obtain the carrier.

8. The process according to any of the aforesaid aspects, wherein the step (1) includes the following steps,
   (1a') at least a part of the silica source and the binder or a binder precursor are mixed with an acid, to form a slurry, and (1b') the slurry, the rest part of the silica source, the Si—Al molecular sieve having a BEA structure and zinc oxide are mixed together, and molded, dried and calcinated, to obtain the carrier.

9. The process according to any of the aforesaid aspects, wherein the binder precursor is at least one selected from the group consisting of halides, alkoxylates, carboxylic acid salts, hydrated oxides, hydroxides, hydrated hydroxides and oxyhalides, of titanium, tin, zirconium and/or aluminium.

10. The process according to any of the aforesaid aspects, wherein the acid is at least one selected from the group consisting of a water soluble inorganic acid and a water soluble organic acid, and the amount of the acid to be used is such that the pH value of the slurry reaches 0.5-6.

11. A hydrocarbon oil desulfurization process, including contacting a sulfur-containing hydrocarbon oil with the desulfurization adsorbing agent for hydrocarbon oil according to any of the aforesaid aspects, under a condition sufficient to remove at least a part of sulfur from the sulfur-containing hydrocarbon oil.

Technical Effects

According to this invention, the desulfurization adsorbing agent for hydrocarbon oil exhibits a high desulfurization adsorbing activity and stability, and at the same time, is capable of significantly increasing the octane number of the desulfurized product (for example, gasoline).

Best Mode to Carry Out this Invention

In the context of this invention, unless otherwise specified, any reaction or step is conducted at a pressure conventional in this field (for example, the normal pressure), and/or at a temperature conventional in this field (for example, the normal temperature).

This invention relates to a desulfurization adsorbing agent for hydrocarbon oil, on the basis of the total weight of the adsorbing agent, comprising the following components, 1) a Si—Al molecular sieve having a BEA structure, in an amount of 1-20 wt %, 2) at least one binder selected from the group consisting of titanium dioxide, stannic oxide, zirconium oxide and alumina, in an amount of 3-35 wt %, 3) a silica source, in an amount of 5-40 wt %, 4) zinc oxide, in an amount of 10-80 wt %, and 5) at least one promoter metal selected from the group consisting of cobalt, nickel, iron and manganese, based on the metal, in an amount of 5-30 wt %, wherein at least 10 wt % of the promoter metal is present in a reduced valence state (preferably in the metallic state).

According to one embodiment of this invention, the Si—Al molecular sieve having a BEA structure is in an amount of 2-15 wt %, the binder is in an amount of 5-25 wt %, the silica source is in an amount of 10-30 wt %, zinc oxide is in an amount of 25-70 wt %, the promoter metal is in an amount of 8-25 wt %.

According to another embodiment of this invention, the Si—Al molecular sieve having a BEA structure is in an amount of 2-10 wt %, the binder is in an amount of 8-15 wt %, the silica source is in an amount of 12-25 wt %, zinc oxide is in an amount of 40-60 wt %, the promoter metal is in an amount of 12-20 wt %.

According to a further embodiment of this invention, the desulfurization adsorbing agent for hydrocarbon oil can be produced in line with a process including the following steps, (1) contacting at least one binder selected from the group consisting of titanium dioxide, stannic oxide, zirconium oxide and alumina with the silica source, the Si—Al molecular sieve having a BEA structure and zinc oxide, to obtain a carrier, (2) contacting the carrier with a promoter metal-containing compound, to obtain a precursor of the adsorbing agent, and (3) under a condition sufficient to present at least 10 wt % of the promoter metal in a reduced valence state, treating the precursor of the adsorbing agent, to obtain the desulfurization adsorbing agent for hydrocarbon oil.

According to this invention, as the Si—Al molecular sieve having a BEA structure, any Si—Al molecular sieve having a BEA structure known in this field can be used, without any specific limitation. The molecular sieve could be used with one kind or as a mixture of two or more kinds.

According to a preferred embodiment of this invention, the Si—Al molecular sieve having a BEA structure is a Beta-molecular sieve, which has a formula of ($Na_n[Al_n Si_{64-n}O_{128}]$, $n<7$), and presents as a mixed crystal formed by two structurally different but closely correlated polymorphs A and B, both having a three-dimensional twelve-membered-ring channel system, the polymorph A forming a pair of enantiomers, having a space group of $P4_122$ and $P4_322$, and a cell parameter of a=12.5 Å, b=26.6 Å, the polymorph B being the achiral space group C2/c, and having a cell parameter of a=17.6 Å, b=17.8 Å, c=14.4 Å, β=114.5°. The size of the twelve-membered-ring channel in the molecular sieve having a BEA structure is 7.3 Å×6.0 Å <100 direction> and 5.6 Å×5.6 Å <001 direction>.

According to this invention, there is no specific limitation as to the particle size of the Si—Al molecular sieve having a BEA structure, generally 10-1000 nm, preferably 100-500 nm, but not limiting thereto. There is no specific limitation as to the specific surface area of the Si—Al molecular sieve having a BEA structure, generally 150 m²/g or more, but not limiting thereto.

According to this invention, the silica source refers to a material containing silica, which could be silica per se, also could be a natural mineral having a silica content of more than 45 wt %. The natural mineral may contain other components like $Al_2O_3$, $K_2O$, CaO, MgO, $Fe_2O_3$, $TiO_2$, and the like. The silica source for example could be at least one selected from the group consisting of diatomite, expanded perlite, kaolin, silicolite, colloid silica, precipitated silica, fumed silica, silica sol, macro-porous silica and silica gel. The silica source could be used with one kind or as a mixture of two or more kinds.

According to this invention, zinc oxide may generally has a purity of more than 99%.

According to this invention, the binder is at least one selected from the group consisting of titanium dioxide, stannic oxide, zirconium oxide, and alumina. The binder could be used in a crystalline form (for example an anatase type titanium dioxide), or in an amorphous form, or in a colloidal form (for example a sol or colloid), or in a dispersion form (for example an aqueous slurry), without any specific limitation. The binder could be used with one kind or as a mixture of two or more kinds.

According to this invention, the term "promoter metal" refers to a metal component which helps to promote removing sulfur from a hydrocarbon oil after introduced into the adsorbing agent of this invention. The promoter metal is preferably at least one selected from the group consisting of cobalt, nickel, iron, and manganese, more preferably nickel. The promoter metal could be used with one kind or as a mixture of two or more kinds.

According to this invention, at least a part of the promoter metal in the adsorbing agent of this invention should exist in a reduced valence state. Though not intended to be bound by any theory, it is believed that a promoter in a reduced valence state is capable of chemically adsorbing, cracking or removing sulfur. To this end, it is necessary to reduce the number of the oxygen atom bonded to the metal, or to make the oxidation valence of the metal to be 0 (i.e. in a metallic or elemental state). For example, if nickel is used as the promoter metal, it is known that nickel oxide (NiO) is in the normal oxidation state, and then nickel (promoter metal) in a reduced valence state could be metallic nickel ($Ni^0$) or a nickel oxide having a formula of $NiO_{(1-x)}$ in a non-stoichiometric oxidation state, wherein $0<x<1$. When cobalt is used as the promoter metal, it is known that cobalt oxide (CoO) is in the normal oxidation state, and then cobalt (promoter metal) in a reduced valence state could be metallic cobalt) ($Co^0$) or a cobalt oxide having a formula of $CoO_{(1-y)}$ in a non-stoichiometric oxidation state, wherein $0<y<1$. When iron is used as the promoter metal, it is known that iron oxide ($Fe_2O_3$) is in the normal oxidation state, and then iron (promoter metal) in a reduced valence state could be metallic iron ($Fe^0$) or an iron oxide having a formula of $Fe_2O_{(3-a)}$ in a non-stoichiometric oxidation state, wherein $0<a<3$. When manganese is used as the promoter metal, it is known that manganese oxide ($MnO_2$) is in the normal oxidation state, and then manganese (promoter metal) in a reduced valence state could be metallic manganese) ($Mn^0$) or a manganese oxide having a formula of $MnO_{(2-b)}$ in a non-stoichiometric oxidation state, wherein $0<b<2$.

It is preferred that, the amount of the promoter metal in the desulfurization adsorbing agent for hydrocarbon oil of this invention is such that when the adsorbing agent is made to contact with a sulfur-containing hydrocarbon oil under a desulfurization condition described in this specification, it can effectively remove sulfur from said hydrocarbon oil. For an optimized desulfurization activity, in the adsorbing agent of this invention, with respect to the whole amount of the promoter metal, preferably at least about 10 wt % of the promoter metal is present in a reduced valence state (preferably in the metallic state), more preferably at least about 40 wt % of the promoter metal is present in a reduced valence state (preferably in the metallic state), and most preferably at least 80 wt %, at least 90 wt % or more of the promoter metal is present in a reduced valence state (preferably in the metallic state).

According to the process for producing the desulfurization adsorbing agent for hydrocarbon oil of this invention, in the step (1) (hereinafter referred to as contacting step), the starting materials (i.e. the at least one binder selected from the group consisting of titanium dioxide, stannic oxide, zirconium oxide and alumina, the silica source, the Si—Al molecular sieve having a BEA structure and zinc oxide) are made to contact with one another (for example, mixed together), at the respective aforesaid predetermined amount, so as to obtain a contacting resultant of this invention (i.e. the carrier). In this step, there is no specific limitation as to the contacting order or contacting sequence of the starting materials.

According to this invention, there is no specific limitation as to how to conduct the contacting step, as long as the starting materials could sufficiently contact with one another so as to form a homogeneous contacting resultant. For example, the starting materials could be mixed together till homogeneous by any means known in this field.

If necessary, for a more sufficient and homogeneous contacting, or to facilitate the contacting, the contacting step could be conducted in the presence of a liquid or gas medium. At this time, the obtained contacting resultant could be in the form of a slurry, a dough or a cream like mixture.

The contacting step could be conducted at any temperature ranging from 0° C. to 70° C. From the standpoint of convenience, the normal temperature is preferred, but not limiting thereto. The contacting could last for a duration sufficient to obtain a homogeneous contacting resultant, generally 0.5 to 5 hours, but not limiting thereto.

According to this invention, the contacting resultant after produced, if needed, could be further molded, dried and calcinated by any means known in this field.

Specifically, the thus obtained contacting resultant could be molded into extrudates, pellets, tablets, spheres or microspheres by any means known in this field. For example, when the contacting resultant presents as a dough or a cream like mixture, the contacting resultant could be directly molded (preferably by extrusion) into a cylindrical extrudate having a diameter generally of 1.0-8.0 mm and a length generally of 2.0-5.0 mm. Then, the thus obtained extrudate is dried and calcinated. When the contacting resultant presents as a slurry, the contacting resultant could be dried into a dough or a cream like mixture, and then molded as aforesaid. Or alternatively, the slurry could be directly molded by a spray drying method into micro-spheres having a particle size of about 20-200 μm. At this time, for easy operation of the spray drying, it is preferred to adjust the solid content of the slurry to the level of 10-50 wt %, preferably 20-50 wt %, before drying.

According to this invention, the drying can be conducted in any conventional manner, without any specific limitation. For example, the drying could be air drying, baking or forced air drying. The temperature involved in the drying could be from the room temperature to 400° C., preferably 100-350° C., but not limiting thereto.

According to this invention, the calcinating can be conducted in any conventional manner, without any specific limitation. Generally speaking, the temperature involved in the calcinating could be 400-700° C., preferably 450-650° C., while the duration of the calcinating could be generally at least 0.5 hours, preferably 0.5-100 hours, more preferably 0.5-10 hours, but not limiting thereto.

In view of these embodiments, it is preferred that the step (1) of the process for producing the desulfurization adsorbing agent for hydrocarbon oil of this invention further includes a step of molding (as aforesaid), drying (as aforesaid), and calcinating (as aforesaid) the contacting resultant (called as step (1-1)). The resultant obtained from this step (1-1) is also called as carrier in the context of this invention.

According to one embodiment of this invention, the contacting step is preferably conducted in line with the following Manner A or Manner B.

The Manner A includes the following steps, (1a) the binder or a binder precursor is mixed with an acid, to form a slurry, and (1b) the slurry, the silica source, the Si—Al molecular sieve having a BEA structure and zinc oxide are mixed together, and molded, dried and calcinated, to obtain the carrier.

The Manner B includes the following steps, (1a') at least a part of the silica source and the binder or a binder precursor are mixed with an acid, to form a slurry, and (1b') the slurry, the rest part of the silica source, the Si—Al molecular sieve having a BEA structure and zinc oxide are mixed together, and molded, dried and calcinated, to obtain the carrier.

According to this invention, the acid to be used is at least one selected from the group consisting of a water soluble inorganic acid and a water soluble organic acid, and the amount of the acid to be used (if more than one acids are used, the total amount of the acids to be used) is such that the eventually obtained slurry exhibits a pH value of 0.5-6, preferably 1-6, more preferably 1-5, further preferably 1-4, most preferably 1.5-4. The acid could be used with one kind or as a mixture of two or more kinds.

The acid is preferably at least one selected from the group consisting of hydrochloric acid, nitric acid, phosphoric acid and acetic acid. If necessary, or for the ease of operation, the acid could be used in the form of an aqueous solution.

According to this invention, by the expression "binder precursor", it refers to a compound that can be converted into the binder by a suitable treatment (for example after being subject to the steps (1a) and (1b), or after being subject to the steps (1a') and (1b')). As the precursor, exemplified can be halides, alkoxylates, carboxylic acid salts, hydrated oxides, hydroxides, hydrated hydroxides and oxyhalides, of the metal M, wherein M is at least one selected from the group consisting of titanium, tin, zirconium and aluminium. The precursor could be used with one kind or as a mixture of two or more kinds.

Specifically, the precursor of titanium dioxide can be exemplified as titanium tetrachloride, ethyl titanate, isopropyl titanate, titanium acetate and hydrated titanium oxide. If starting with an anatase type titanium dioxide, it is possible to re-obtain titanium dioxide after the steps (1a) and (1b) or the steps (1a') and (1b'), and for this reason, the anatase type titanium dioxide sometimes is also called as the precursor of titanium dioxide. The precursor of titanium dioxide could be used with one kind or as a mixture of two or more kinds. The precursor of zirconium oxide can be exemplified as zirconium tetrachloride, zirconium oxychloride, zirconium acetate and hydrated zirconium oxide. If starting with an amorphous zirconium oxide, after the steps (1a) and (1b) or the steps (1a') and (1b'), it is possible to re-obtain zirconium oxide, and for this reason, the amorphous zirconium oxide sometimes is also called as the precursor of zirconium oxide. The precursor of zirconium oxide could be used with one kind or as a mixture of two or more kinds. The precursor of stannic oxide can be exemplified as tin tetrachloride, tin tetraisopropanolate, tin acetate and hydrated tin oxide. The precursor of stannic oxide could be used with one kind or as a mixture of two or more kinds. The precursor of alumina can be exemplified as hydrated alumina, aluminium sol, boehmite, pseudo boehmite, trihydrated alumina, and amorphous aluminium hydroxide. The precursor of alumina could be used with one kind or as a mixture of two or more kinds. Alumina eventually formed from the precursor of alumina generally presents as $\gamma$-$Al_2O_3$.

According to this invention, there is no specific limitation as to how to conduct the step (1a), as long as the binder or the precursor and the acid (preferably an aqueous solution of the acid) can be mixed thoroughly, so as to obtain a homogeneous slurry. Similarly, there is no specific limitation as to how to conduct the step (1a'), as long as the binder or the precursor, the acid (preferably an aqueous solution of the acid) and at least a part of the silica source can be mixed thoroughly, to obtain a homogeneous slurry. In both cases, the mixing can be conducted at a temperature ranging from 0° C. to 70° C., from the standpoint of convenience, preferably from 5° C. to 40° C., but not limiting thereto. The duration of the mixing is such that a homogeneous slurry can be obtained, generally 0.5 to 5 hours, but not limiting thereto.

According to this invention, the expression "at least a part of the silica source" means that the amount of the silica source to be used in the step (1a') presents as at least a part of the whole amount of the silica source to be used for producing the desulfurization adsorbing agent for hydrocarbon oil of this invention. For example, the amount represented by "at least a part" herein could be 30 wt % or more, preferably 50 wt % or more, more preferably 70 wt % or more, more preferably 90 wt % or more, of the whole amount of the silica source, or for example 100 wt %. Further, the expression "the rest part of the silica source" refers to the rest amount of the silica source obtained by deducting the aforesaid amount represented by "at least a part" from the whole amount. For example, the amount represented by "the rest part" herein could be 70 wt % or less, preferably 50 wt % or less, more preferably 30 wt % or less, more preferably 10 wt % or less, of the whole amount of the silica source, or for example, 0 wt %; in this case, no silica source will be used at the step (1b').

If a precursor is used in the step (1a), the precursor reacts with the acid to form an adhesive hydrolysate solution, i.e. a gel solution. The gel solution herein is also called as slurry. Similarly, if a precursor is used in the step (1a'), the precursor reacts with the acid, to form an adhesive hydrolysate solution, i.e. a gel solution. The gel solution and the at least a part of the silica source form herein-so-called slurry. In this case, the duration of the mixing involving in the step (1a) or the step (1a') is the same as aforesaid. However, for a more sufficient hydrolysis reaction and a more homogeneous system, it is known in this field that if needed, the obtained gel solution or slurry can be subject to an aging treatment. The aging can be conducted in any manner known in this field, for example at a temperature of 60-90° C., the gel solution or slurry is made to stand for 0.5 to 3 hours, but not limiting thereto. According to this invention, the gel solution or slurry after this aging is also called as slurry.

According to the step (1b) of this invention, the obtained slurry, the silica source, the Si—Al molecular sieve having a BEA structure and zinc oxide are mixed together, and molded, dried and calcinated, so as to obtain a carrier. Or, according to the step (1b'), the slurry, the rest part of the silica source, the Si—Al molecular sieve having a BEA structure and zinc oxide are mixed together, and molded, dried and calcinated, to obtain a carrier. In both cases, the slurry, the silica source (or the rest part thereof), the Si—Al molecular sieve having a BEA structure and zinc oxide can be mixed together by any sequence and in any manner, as long as a homogeneous mixture (i.e. the contacting resultant) can be obtained. For example, it is acceptable to introduce into the slurry the silica source (or the rest part thereof), and then or at the same time, zinc oxide and the Si—Al molecular sieve having a BEA structure, or introduce into the slurry these three simultaneously. Or alternatively, it is acceptable to directly introduce into the slurry the silica source (or the rest part thereof), zinc oxide, and\or the Si—Al molecular sieve having a BEA structure. Obviously, it is also acceptable to convert the silica source (or the rest part thereof), zinc oxide, and \or the Si—Al molecular sieve having a BEA structure into an aqueous slurry, and then conduct the aforesaid introduction.

The step (1b) or step (1b') can be conducted at a temperature ranging from 0° C. to 70° C., from the standpoint of convenience, preferably from 5° C. to 40° C., but not limiting thereto. The duration of the mixing is such that a homogeneous slurry can be obtained, generally 0.5 to 5 hours, but not limiting thereto.

After obtaining the mixture or the contacting resultant, it is acceptable to conduct the molding, drying and calcinating in the same manner as that described in connection with the step (1) or step (1-1) for the contacting resultant, so as to obtain the carrier.

Then, according to the step (2) of this invention, the carrier contacts a promoter metal-containing compound, to obtain a precursor of the adsorbing agent.

According to this invention, the promoter metal-containing compound is a compound that can be converted into the promoter metal by calcinating. As the promoter metal-containing compound, exemplified can be acetates, carbonates, nitrates, sulphates, thiocyanates, hydroxides, hydrated oxides, hydrated hydroxides or oxides, of a metal M', wherein M' represents at least one of cobalt, nickel, iron and manganese, preferably nickel. The promoter metal-containing compound could be used with one kind or as a mixture of two or more kinds.

According to this invention, there is no specific limitation as to the way of contacting the carrier with the promoter metal-containing compound, as long as a thorough contacting can be achieved, so as to form a homogeneous contacting resultant (i.e. the precursor of the adsorbing agent). In this case, there is no specific limitation as to the contacting order or contacting sequence between the carrier and the promoter metal-containing compound.

If necessary, for a more thorough and homogeneous contacting, or to facilitate the contacting, it is acceptable to conduct the contacting in the presence of a liquid or gas medium. In this case, the obtained contacting resultant may be in the form of slurry.

The contacting step can be conducted at any temperature ranging from 0° C. to 70° C., from the standpoint of convenience, preferably from 5° C. to 40° C., but not limiting thereto. The duration of the mixing is such that a homogeneous slurry can be obtained, generally 1 to 20 min, but not limiting thereto.

According to an embodiment of this invention, the contacting between the carrier and the promoter metal-containing compound can be conducted by an impregnation process or a precipitation process known in this field. According to the impregnation process, an aqueous solution or an aqueous suspension of the promoter metal-containing compound is produced, and then the carrier is impregnated with the solution or the suspension, so as to obtain a slurry-like contacting resultant. According to the precipitation process, an aqueous solution or an aqueous suspension of the promoter metal-containing compound is produced, and then the carrier is impregnated with the solution or the suspension, and then aqueous ammonia is introduced thereto, whereby the promoter metal-containing compound forming precipitates onto/into the carrier, so as to obtain a wet or slurry-like contacting resultant.

According to this invention, following production of the contacting resultant, especially when the contacting resultant is in the wet or slurry form, it is acceptable sometimes to dry same in any manner known in this field to remove any liquid medium (for example, water) or gas medium that may have been introduced thereto during the production. For example, the contacting resultant could be dried at a temperature of about 50-300° C., preferably 100-250° C., with a drying duration of about 0.5-8 hours, preferably about 1-5 hours.

According to this invention, following production of the contacting resultant (preferably following the aforesaid drying), it is acceptable sometimes to calcine same in any manner known in this field, so as to convert the promoter metal contained in the contacting resultant into its corresponding metal oxide. For example, the calcinating could be conducted in the presence of oxygen or under an oxygen atmosphere (with an oxygen content of for example more than 20 vol %, preferably more than 40 vol %), at a temperature of about 300-800° C., more preferably 450-750° C. The duration of the calcinating is generally about 0.5-4 hours, preferably 1-3 hours. The contacting resultant after this calcinating is also herein called as precursor of the adsorbing agent or sometimes as calcinated precursor of the adsorbing agent.

To this end, the process for producing the desulfurization adsorbing agent for hydrocarbon oil of this invention preferably includes in the step (2) a step of drying (as aforesaid) and calcinating (as aforesaid) the precursor of the adsorbing agent (called as step (2-1)).

Then, according to the step (3) of this invention, the precursor of the adsorbing agent (preferably the calcinated precursor of the adsorbing agent, or the precursor of the adsorbing agent obtained from the step (2-1)) is treated under a condition sufficient to present at least 10 wt % of the promoter metal in a reduced valence state (for example, reduced under a hydrogen atmosphere), to obtain the desulfurization adsorbing agent for hydrocarbon oil of this invention.

According to this invention, the precursor of the adsorbing agent could be reduced at a temperature of 300-600° C. and under a hydrogen atmosphere, so as to necessarily make at least 10 wt % of the promoter metal exist in a reduced valence state (for example in the metallic state). At this time, the temperature is more preferably 400-500° C., the hydrogen content in the hydrogen atmosphere is generally 10-60 vol %, the duration of the reduction is generally 0.5-6 hours, preferably 1-3 hours.

This invention further relates to a hydrocarbon oil desulfurization process, including a step of contacting a sulfur-containing hydrocarbon oil with the desulfurization adsorbing agent for hydrocarbon oil according to this invention under a condition sufficient to remove at least a part of sulfur from the sulfur-containing hydrocarbon oil.

According to this invention, the hydrocarbon oil could be a fcc gasoline or a diesel fuel, wherein the term "fcc gasoline" refers to a hydrocarbon mixture having a boiling range of from 40 to 210° C. or any fraction thereof, which presents as a product from a thermal or catalytic cracking process. An acceptable thermal cracking process includes, but not limiting to, coking, thermal cracking, visbreaking or any combination thereof. An acceptable catalytic cracking process includes, but not limiting to, fluidized bed catalytic cracking, heavy oil catalytic cracking or any combination thereof. Under this circumstance, an acceptable fcc gasoline includes but not limiting to, coking gasoline, thermal cracking gasoline, visbreaking gasoline, fluidized bed catalytic cracking gasoline, heavy oil catalytic cracking gasoline or any combination thereof. In some cases, if needed, the fcc gasoline could be fractionated and/or hydrogenated prior to use in the desulfurization process of this invention as the hydrocarbon oil. According to this invention, the term "diesel fuel" refers to a hydrocarbon mixture having a boiling range of from 170° C. to 450° C. or any fraction thereof. A hydrocarbon oil of this type includes but not limiting to, light cycle oil, kerosene, straight-run diesel oil, hydrotreated diesel oil or any combination thereof.

In the context of this invention, the term "sulfur" includes sulfur of any nature, for example, organic sulfur compounds normally found in hydrocarbon oils (for example in a fcc gasoline or diesel fuel). The sulfur that can be found in the sulfur-containing hydrocarbon oil of this invention could be, but not limiting to, carbonyl sulfide (COS), carbon disulfide ($CS_2$), mercaptan or other thiophenic compounds or any combination thereof, especially thiophenes, benzothiophenes, alkyl thiophenes, alkyl benzothiophenes, and alkyl dibenzothiophenes, and thiophenic compounds having a greater molecular weight that can be normally found in a diesel fuel.

According to this invention, the "condition sufficient to remove at least a part of sulfur from the sulfur-containing hydrocarbon oil" includes, in the presence of hydrogen, a ratio by molar of hydrogen to hydrocarbon oil of 0.1-3, more preferably 0.3-0.8, a WHSV of 1-15 $hr^{-1}$, more preferably 3-8 $hr^{-1}$, a reaction temperature of 350-500° C., preferably 400-450° C., a reaction pressure of 0.5-4 MPa, preferably 1.0-2.0 MPa.

If necessary, the desulfurization adsorbing agent for hydrocarbon oil of this invention could be reused after use (e.g. after losing at least a part of the desulfurization activity) by a regeneration and reduction procedure. The regeneration condition includes, in the presence of oxygen or under an oxygen atmosphere (with an oxygen content of for example more than 5 vol %, preferably more than 200 vol %), under the normal pressure, at a temperature of 400-700° C., preferably 500-600° C., a regeneration duration of 0.5 to 2 hours. The reduction condition includes, in the presence of hydrogen or under a hydrogen atmosphere, at a temperature of 350-500° C., preferably 370-450° C., at a pressure of 0.2-2 MPa, preferably 0.2-1.5 MPa, a reduction duration of 0.2 to 2 hours.

EXAMPLE

The following examples illustrate, not limit, this invention in more details.

In the following Examples and Comparative Examples, the composition of the desulfurization adsorbing agent for hydrocarbon oil was determined by a XRD (X ray diffraction) analysis.

Example I-1

The adsorbing agent was produced as follows: 2.42 kg titanium tetrachloride (from the Beijing Chemical Plant, AR, 99 wt %) was slowly added to 3.2 kg acidic water, and then stirred gently to avoid precipitation of titanium oxide crystals, at this time the solution presented as a colorless and transparent colloidal solution, called as titanium sol. Then to the titanium sol was added 2.10 kg expanded perlite (from the Global Mineral company, calculated on a dry basis as 2.06 kg) and then stirred and mixed till homogeneous, to obtain a slurry A.

4.43 kg zinc oxide powder (from the Headhorse company, having a purity of 99.7 wt %), 0.84 kg Beta-molecular sieve (from the Nanjing catalyst Division of the Sinopec, calculated on a dry basis as 0.70 kg), and 4.57 kg deionized water were mixed, and after stirred for 30 minutes, to obtain a slurry B. The slurry B was added to the slurry A, and after stirred for 1 hour, to obtain a carrier slurry.

The carrier slurry was spray dried by a spray drier of the MODEL Bowen Nozzle Tower™, at a spray drying pressure of 8.5 to 9.5 MPa, an entrance temperature of 500° C. or less, an exit temperature of about 150° C. The microspheres obtained from the spray drying was firstly dried at 180° C. for 1 hour, then at 635° C. calcinated for 1 hour, to obtain a carrier for the adsorbing agent.

3.2 kg of the carrier for the adsorbing agent was solution impregnated by 3.51 kg hexahydrated nickel nitrate (from the Beijing Chemical Reagent Company, having a purity of more than 98.5 wt %) in 0.6 kg deionized water, the resultant mixture was dried at 180° C. for 4 hours, and then under air atmosphere at 635° C. calcinated for 1 hour, to obtain a precursor of the adsorbing agent.

The precursor of the adsorbing agent was reduced at 425° C. under a hydrogen atmosphere for 2 hours, to obtain an adsorbing agent. The adsorbing agent was named as adsorbing agent I-A1. The composition of the adsorbing agent I-A1 is: a zinc oxide content of 44.3 wt %, an expanded perlite content of 20.6 wt %, a Beta-molecular sieve content of 7.0 wt %, a titanium dioxide content of 10.0 wt %, a nickel content of 18.1 wt %.

Example I-2

1.26 kg titanium dioxide (the anatase type, on a dry basis, containing titanium dioxide as 1.17 kg) was added to 2.6 kg 10% hydrochloric acid (CP, from the Beijing Chemical Plant), after stirred and acidated for 1 hour, at this time titanium oxide was completely dissolved into a colorless and transparent colloidal solution, called as titanium sol. Then to the titanium sol was added 1.54 kg diatomite (from the Global Mineral company, calculated on a dry basis as 1.50 kg) and then mixed under stirring, to obtain a slurry A.

5.52 kg zinc oxide powder (from the Headhorse company, having a purity of 99.7%), 0.36 kg Beta-molecular sieve (from the Nanjing catalyst Division of the Sinopec, calculated on a dry basis as 0.30 kg), and 5.0 kg deionized water were mixed and stirred for 30 minutes, to obtain a slurry B. The slurry B was added to the slurry A, and after stirred for 1 hour, to obtain a carrier slurry.

Following the procedure of Example I-1, the carrier slurry was spray dried and molded, and then introduced thereto the active component nickel, to obtain an adsorbing agent I-A2. The composition of the adsorbing agent I-A2 is: a zinc oxide content of 55.2 wt %, a titanium dioxide content of 11.7 wt %, a diatomite content of 15.0 wt %, a Beta-molecular sieve content of 3.0 wt %, a nickel content of 15.1 wt %.

Example I-3

The adsorbing agent was produced as follows: 3.87 kg ethyl titanate (from the Aldrich company, AR, 99%) under stirring was slowly added to 3.2 kg 10% nitric acid (CP, from the Beijing Chemical Plant), after stirred for 1 hour, at this time the solution presented as a light yellow and transparent colloidal solution, called as titanium sol.

4.93 kg zinc oxide powder (from the Headhorse company, having a purity of 99.7%), 1.64 kg diatomite (from the Global Mineral company, calculated on a dry basis as 1.60 kg), 0.56 kg USY molecular sieve (from the Qilu Catalyst Division of the Sinopec, calculated on a dry basis as 0.50 kg), and 6.40 kg deionized water were mixed, and after stirred for 30 minutes, to obtain a slurry. The slurry was added to the titanium sol, and after stirred for 1 hour, to obtain a carrier slurry.

Following the procedure of Example I-1, the carrier slurry was spray dried and molded, and then introduced thereto active components nickel and cobalt, to obtain an adsorbing agent I-A3. The composition of the adsorbing agent I-A3 is: a zinc oxide content of 49.3 wt %, a titanium dioxide content of 13.5 wt %, a diatomite content of 16.0 wt %, a USY content of 5.0 wt %, a nickel content of 8.1 wt %, a cobalt content of 8.1 wt %.

Example I-4

The adsorbing agent was produced as follows: 3.36 kg ethyl titanate (from the Aldrich company, AR, 99%) under stirring was slowly added to 3.2 kg 10% nitric acid (CP, from the Beijing Chemical Plant), after stirred for 1 hour, at this time the solution presented as a light yellow and transparent colloidal solution, called as titanium sol.

5.52 kg zinc oxide powder (from the Headhorse company, having a purity of 99.7%), 2.03 kg kaolin (from the Suzhou Kaolin Factory, calculated on a dry basis as 1.50 kg), 0.36 kg X molecular sieve (from the Qilu Catalyst Division of the Sinopec, calculated on a dry basis as 0.30 kg), and 6.40 kg deionized water were mixed, and after stirred for 30 minutes, to obtain a slurry. The slurry was added to the titanium sol, and after stirred for 1 hour, to obtain a carrier slurry.

Following the procedure of Example I-1, the carrier slurry was spray dried and molded, and then introduced thereto the active component nickel, to obtain an adsorbing agent I-A4. The composition of the adsorbing agent I-A4 is: a zinc oxide content of 55.2 wt %, a titanium dioxide content of 11.7 wt %, a kaolin content of 15.0 wt %, a X molecular sieve content of 3.0 wt %, a nickel content of 15.1 wt %.

Example I-5

The adsorbing agent was produced as follows: 2.42 kg titanium tetrachloride (from the Beijing Chemical Plant, AR, 99 wt %) was slowly added to 3.2 kg acidic water, and then stirred gently to avoid precipitation of titanium oxide crystals, at this time the solution presented as a colorless and transparent colloidal solution, called as titanium sol. Then to the titanium sol was added 2.10 kg expanded perlite (from the Global Mineral company, calculated on a dry basis as 2.06 kg) and then stirred and mixed till homogeneous, to obtain a slurry A.

4.43 kg zinc oxide powder (from the Headhorse company, having a purity of 99.7 wt %), 0.78 kg USY molecular sieve (from the Qilu Catalyst Division of the Sinopec, calculated on a dry basis as 0.70 kg), and 4.57 kg deionized water were mixed, and after stirred for 30 minutes, to obtain a slurry B. The slurry B was added to the slurry A, and after stirred for 1 hour, to obtain a carrier slurry.

Following the procedure of Example I-1, the carrier slurry was spray dried and molded, and then introduced thereto the active component nickel, to obtain an adsorbing agent I-A4. The composition of the adsorbing agent I-A4 is: a zinc oxide content of 44.3 wt %, an expanded perlite content of 20.6 wt %, a USY molecular sieve content of 7.0 wt %, a titanium dioxide content of 10.0 wt %, a nickel content of 18.1 wt %.

Comparative Example I-1

The adsorbing agent was produced as follows: 3.31 kg titanium tetrachloride (from the Beijing Chemical Plant, AR, 99 wt %) was slowly added to 5.0 kg acidic water, and then stirred gently to avoid precipitation of titanium oxide crystals, at this time the solution presented as a colorless and transparent colloidal solution, called as titanium sol. Then to the titanium sol was added 2.45 kg expanded perlite (from the Global Mineral company, calculated on a dry basis as 2.40 kg) and then stirred and mixed till homogeneous, to obtain a slurry A.

4.43 kg zinc oxide powder (from the Headhorse company, having a purity of 99.7 wt %), and 4.57 kg deionized water were mixed, and after stirred for 30 minutes, to obtain a slurry B. The slurry B was added to the slurry A, and after stirred for 1 hour, to obtain a carrier slurry.

Following the procedure of Example I-1, the carrier slurry was spray dried and molded, and then introduced thereto the active component nickel, to obtain an adsorbing agent I-B1. The composition of the adsorbing agent 1-B1 is: a zinc oxide content of 44.3 wt %, an expanded perlite content of 24.0 wt %, a titanium dioxide content of 13.6 wt %, a nickel content of 18.1 wt %.

Comparative Example I-2

1.26 kg titanium dioxide (the anatase type, on a dry basis, containing titanium dioxide as 1.17 kg) was added to 2.6 kg 10% hydrochloric acid (CP, from the Beijing Chemical Plant), after stirred and acidated for 1 hour, at this time titanium oxide was completely dissolved into a colorless and transparent colloidal solution, called as titanium sol. Then to the titanium sol was added 1.85 kg diatomite (from the Global Mineral company, calculated on a dry basis as 1.80 kg) and then mixed under stirring, to obtain a slurry A.

5.52 kg zinc oxide powder (from the Headhorse company, having a purity of 99.7%), and 5.0 kg deionized water were mixed and stirred for 30 minutes, to obtain a slurry B. The slurry B was added to the slurry A, and after stirred for 1 hour, to obtain a carrier slurry.

Following the procedure of Example I-1, the carrier slurry was spray dried and molded, and then introduced thereto the active component nickel, to obtain an adsorbing agent I-B2. The composition of the adsorbing agent I-B2 is: a zinc oxide content of 55.2 wt %, a titanium dioxide content of 11.7 wt %, a diatomite content of 18.0 wt %, a nickel content of 15.1 wt %.

Comparative Example I-3

The adsorbing agent was produced as follows: 3.87 kg ethyl titanate (from the Aldrich company, AR, 99%) under stirring was slowly added to 3.2 kg 10% nitric acid (CP, from the Beijing Chemical Plant), after stirred for 1 hour, at this time the solution presented as a light yellow and transparent colloidal solution, called as titanium sol.

4.93 kg zinc oxide powder (from the Headhorse company, having a purity of 99.7%), 2.15 kg diatomite (from the Global Mineral company, calculated on a dry basis as 2.10 kg), and 6.80 kg deionized water were mixed, and after stirred for 30 minutes, to obtain a slurry. The slurry was added to the titanium sol, and after stirred for 1 hour, to obtain a carrier slurry.

Following the procedure of Example I-1, the carrier slurry was spray dried and molded, and then introduced thereto active components nickel and cobalt, to obtain an adsorbing agent I-B3. The composition of the adsorbing agent I-B3 is: a zinc oxide content of 49.3 wt %, a titanium dioxide content of 13.5 wt %, a diatomite content of 21.0 wt %, a nickel content of 8.1 wt %, a cobalt content of 8.1 wt %.

Comparative Example I-4

The adsorbing agent was produced as follows: 3.36 kg ethyl titanate (from the Aldrich company, AR, 99%) under stirring was slowly added to 3.2 kg 10% nitric acid (CP, from the Beijing Chemical Plant), after stirred for 1 hour, at this time the solution presented as a light yellow and transparent colloidal solution, called as titanium sol.

5.52 kg zinc oxide powder (from the Headhorse company, having a purity of 99.7%), 2.44 kg kaolin (from the Suzhou Kaolin Factory, calculated on a dry basis as 1.80 kg), and 7.00 kg deionized water were mixed, and after stirred for 30 minutes, to obtain a slurry. The slurry was added to the titanium sol, and after stirred for 1 hour, to obtain a carrier slurry.

Following the procedure of Example I-1, the carrier slurry was spray dried and molded, and then introduced thereto the active component nickel, to obtain an adsorbing agent I-B4. The composition of the adsorbing agent I-B4 is: a zinc oxide content of 55.2 wt %, a titanium oxide content of 11.7 wt %, a kaolin content of 18.0 wt %, a nickel content of 15.1 wt %.

Example I-6

Each adsorbing agent produced as aforesaid was studied for the desulfurization performance and the octane number. The desulfurization performance was characterized by the sulfur content of the desulfurized product. The sulfur content of the desulfurized product was determined by an off-line chromatograph, evaluated on a fixed bed microreactor. The feed oil for the desulfurization reaction test was a catalytic cracking gasoline having a sulfur content of 640 ppm. The condition of the desulfurization reaction test was: under a hydrogen atmosphere, a reaction temperature of 410° C., a reaction pressure of 1.38 MPa, a ratio by molar of hydrogen to hydrocarbon oil of 0.35, a WHSV of 4 $hr^{-1}$. To accurately reflect the activity of the adsorbing agent in practice at an industrial scale, upon completion of the reaction, the adsorbing agent was regenerated at 550° C. under air atmosphere. The test runs were repeated for six cycles of reaction and regeneration, and then the adsorbing agent exhibits a substantially stable activity. The desulfurization performance of the adsorbing agent herein was characterized by the sulfur content of the product gasoline observed with this adsorbing agent exhibiting a substantially stable activity, which was listed in Table I-1. The product gasoline was weighted for calculation of the yield.

The Chinese national standards GB/T 503-1995 and GB/T 5487-1995 were respectively followed to determine the motor-method octane number (MON) and the research octane number (RON) of gasoline before and after the desulfurization reaction test. The results were given in Table I-1. As can be seen from Table I-1, by using an adsorbing agent comprising a molecular sieve having a BEA structure, the octane number of the product gasoline can be increased in each case.

Example II-1

2.33 kg crystalline tin tetrachloride ($SnCl_4.5H_2O$, from the Alfa Aesar company, having a purity of 99 wt %) was slowly added to 3.2 kg acidic water, and then stirred gently to avoid precipitation of tin oxide crystals, to obtain a colorless and transparent tin sol. Then to the tin sol was added 2.10 kg expanded perlite (from the Global Mineral company, calculated on a dry basis as 2.06 kg) and then stirred and mixed till homogeneous, to obtain a slurry A.

4.43 kg zinc oxide powder (from the Headhorse company, having a purity of 99.7 wt %), 0.84 kg Beta-molecular sieve (from the Nanjing catalyst Division of the Sinopec, calculated on a dry basis as 0.70 kg), and 4.57 kg deionized water were mixed, and after stirred for 30 minutes, to obtain a slurry B. The slurry B was added to the slurry A, and after stirred for 1 hour, to obtain a carrier slurry.

The carrier slurry was spray dried by a spray drier of the MODEL Bowen Nozzle Tower™, at a spray drying pressure of 8.5 to 9.5 MPa, an entrance temperature of 500° C. or less, an exit temperature of about 150° C. The microspheres obtained from the spray drying was firstly dried at 180° C. for 1 hour, then at 635° C. calcinated for 1 hour, to obtain an a carrier for the adsorbing agent.

3.2 kg of the carrier for the adsorbing agent was solution impregnated by 3.51 kg hexahydrated nickel nitrate (from the Beijing Chemical Reagent Company, having a purity of more than 98.5 wt %) in 0.6 kg deionized water, the resultant mixture was at 180° C. dried for 4 hours, and then under air atmosphere at 635° C. calcinated for 1 hour, to obtain a precursor of the adsorbing agent.

The precursor of the adsorbing agent was reduced at 425° C. under a hydrogen atmosphere for 2 hours, to obtain an adsorbing agent. The adsorbing agent was named as adsorbing agent II-A1. The composition of the adsorbing agent II-A1 is: a zinc oxide content of 44.3 wt %, an expanded perlite content of 20.6 wt %, a Beta-molecular sieve content of 7.0 wt %, a stannic oxide content of 10.0 wt %, a nickel content of 18.1 wt %.

Example II-2

1.26 kg dibutyl tin oxide (from the Aldrich company, AR, 99 wt %) was added to 2.6 kg 10% hydrochloric acid (CP, from the Beijing Chemical Plant), and then heated to 80° C. and aged for 1 hour, at this time tin oxide was completely dissolved into a colorless and transparent colloidal solution, called as tin sol. Then to the tin sol was added 1.54 kg

TABLE I-1

| | desulfurization performance and octane number | | | | | | | | |
|---|---|---|---|---|---|---|---|---|---|
| adsorbing agent | I-A1 | I-A2 | I-A3 | I-A4 | I-A5 | I-B1 | I-B2 | I-B3 | I-B4 |
| sulfur content of the product gasoline/ppm | 11 | 5 | 12 | 6 | 10 | 12 | 6 | 14 | 7 |
| ΔMON | 0.50 | 0.15 | 0.35 | 0.10 | 0.55 | −0.50 | −0.40 | −0.50 | −0.40 |
| ΔRON | 0.40 | 0.05 | 0.25 | 0.15 | 0.45 | −0.50 | −0.40 | −0.40 | −0.35 |
| Δ(RON + MON)/2 | 0.45 | 0.10 | 0.30 | 0.13 | 0.50 | −0.50 | −0.40 | −0.45 | −0.38 |
| product gasoline yield/% | 99.8 | 99.9 | 99.9 | 99.9 | 99.8 | 99.7 | 99.9 | 99.8 | 99.9 |

Note:
1. The feed gasoline has a sulfur content of 640 ppm, a RON of 93.0, a MON of 82.7,
2. ΔMON represents the increment in the MON of the product,
3. ΔRON represents the increment in the RON of the product,
4. Δ(RON + MON)/2 represents the difference between the anti-knock index of the product and that of the feed.

diatomite (from the Global Mineral company, calculated on a dry basis as 1.50 kg) and then mixed under stirring, to obtain a slurry A.

5.52 kg zinc oxide powder (from the Headhorse company, having a purity of 99.7%), 0.36 kg Beta-molecular sieve (from the Nanjing catalyst Division of the Sinopec, calculated on a dry basis as 0.30 kg), and 5.0 kg deionized water were mixed and stirred for 30 minutes, to obtain a slurry B. The slurry B was added to the slurry A, and after stirred for 1 hour, to obtain a carrier slurry.

Following the procedure of Example II-1, the carrier slurry was spray dried and molded, and then introduced thereto the active component nickel, to obtain an adsorbing agent II-A2. The composition of the adsorbing agent II-A2 is: a zinc oxide content of 55.2 wt %, a stannic oxide content of 11.7 wt %, a diatomite content of 15.0 wt %, a Beta-molecular sieve content of 3.0 wt %, a nickel content of 15.1 wt %.

Example II-3

3.19 kg tin acetate (from the Aldrich company, AR, 99 wt %) under stirring was slowly added to 3.5 kg 5% hydrochloric acid (CP, from the Beijing Chemical Plant), after stirred for 1 hour, at this time the solution presented as a white sol.

4.93 kg zinc oxide powder (from the Headhorse company, having a purity of 99.7%), 1.64 kg diatomite (from the Global Mineral company, calculated on a dry basis as 1.60 kg), 0.56 kg USY molecular sieve (from the Qilu Catalyst Division of the Sinopec, calculated on a dry basis as 0.50 kg), and 6.40 kg deionized water were mixed, and after stirred for 30 minutes, to obtain a slurry B. The slurry B was added to the white sol, and after stirred for 1 hour, to obtain a carrier slurry.

Following the procedure of Example II-1, the carrier slurry was spray dried and molded, and then introduced thereto active components nickel and cobalt, to obtain an adsorbing agent II-A3. The composition of the adsorbing agent II-A3 is: a zinc oxide content of 49.3 wt %, a stannic oxide content of 13.5 wt %, a diatomite content of 16.0 wt %, a USY content of 5.0 wt %, a nickel content of 8.1 wt %, a cobalt content of 8.1 wt %.

Example II-4

2.64 kg tin acetate (from the Aldrich company, AR, 99 wt %) under stirring was slowly added to 3.5 kg 5% hydrochloric acid (CP, from the Beijing Chemical Plant), after stirred for 1 hour, at this time the solution presented as a white sol.

5.52 kg zinc oxide powder (from the Headhorse company, having a purity of 99.7%), 2.03 kg kaolin (from the Suzhou Kaolin Factory, calculated on a dry basis as 1.50 kg), 0.36 kg X molecular sieve (from the Qilu Catalyst Division of the Sinopec, calculated on a dry basis as 0.30 kg), and 6.40 kg deionized water were mixed, and after stirred for 30 minutes, to obtain a slurry B. The slurry B was added to the white sol, and after stirred for 1 hour, to obtain a carrier slurry.

Following the procedure of Example II-1, the carrier slurry was spray dried and molded, and then introduced thereto the active component nickel, to obtain an adsorbing agent II-A4. The composition of the adsorbing agent II-A4 is: a zinc oxide content of 55.2 wt %, a stannic oxide content of 11.7 wt %, a kaolin content of 15.0 wt %, a X molecular sieve content of 3.0 wt %, a nickel content of 15.1 wt %.

Example II-5

2.33 kg crystalline tin tetrachloride ($SnCl_4 \cdot 5H_2O$, from the Alfa Aesar company, having a purity of 99 wt %) was slowly added to 3.2 kg acidic water, and then stirred gently to avoid precipitation of tin oxide crystals, to obtain a colorless and transparent tin sol. Then to the tin sol was added 2.10 kg expanded perlite (from the Global Mineral company, calculated on a dry basis as 2.06 kg) and then stirred and mixed till homogeneous, to obtain a slurry A.

4.43 kg zinc oxide powder (from the Headhorse company, having a purity of 99.7 wt %), 0.78 kg USY molecular sieve (from the Qilu Catalyst Division of the Sinopec, calculated on a dry basis as 0.70 kg), and 4.57 kg deionized water were mixed, and after stirred for 30 minutes, to obtain a slurry B. The slurry B was added to the slurry A, and after stirred for 1 hour, to obtain a carrier slurry.

Following the procedure of Example II-1, the carrier slurry was spray dried and molded, and then introduced thereto the active component nickel, to obtain an adsorbing agent II-A5. The composition of the adsorbing agent II-A5 is: a zinc oxide content of 44.3 wt %, an expanded perlite content of 20.6 wt %, a USY molecular sieve content of 7.0 wt %, a stannic oxide content of 10.0 wt %, a nickel content of 18.1 wt %.

Comparative Example II-1

3.17 kg crystalline tin tetrachloride ($SnCl_4 \cdot 5H_2O$, from the Alfa Aesar company, having a purity of 99 wt %) was slowly added to 4.2 kg acidic water, and then stirred gently to avoid precipitation of tin oxide crystals, to obtain a colorless and transparent tin sol. Then to the tin sol was added 2.45 kg expanded perlite (from the Global Mineral company, calculated on a dry basis as 2.40 kg) and then stirred and mixed till homogeneous, to obtain a slurry A.

4.43 kg zinc oxide powder (from the Headhorse company, having a purity of 99.7 wt %), and 4.57 kg deionized water were mixed, and after stirred for 30 minutes, to obtain a slurry B. The slurry B was added to the slurry A, and after stirred for 1 hour, to obtain a carrier slurry.

Following the procedure of Example II-1, the carrier slurry was spray dried and molded, and then introduced thereto the active component nickel, to obtain an adsorbing agent II-B1. The composition of the adsorbing agent II-B1 is: a zinc oxide content of 44.3 wt %, an expanded perlite content of 24.0 wt %, a stannic oxide content of 13.6 wt %, a nickel content of 18.1 wt %.

Comparative Example II-2

1.26 kg dibutyl tin oxide (from the Aldrich company, AR, 99 wt %) was added to 2.6 kg 10% hydrochloric acid (CP, from the Beijing Chemical Plant), and then heated to 80° C. and aged for 1 hour, at this time tin oxide was completely dissolved into a colorless and transparent colloidal solution, called as tin sol. Then to the tin sol was added 1.85 kg diatomite (from the Global Mineral company, calculated on a dry basis as 1.80 kg) and then mixed under stirring, to obtain a slurry A.

5.52 kg zinc oxide powder (from the Headhorse company, having a purity of 99.7%), and 5.0 kg deionized water were mixed and stirred for 30 minutes, to obtain a slurry B. The slurry B was added to the slurry A, and after stirred for 1 hour, to obtain a carrier slurry.

Following the procedure of Example II-1, the carrier slurry was spray dried and molded, and then introduced thereto the active component nickel, to obtain an adsorbing agent II-B2. The composition of the adsorbing agent II-B2 is: a zinc oxide content of 55.2 wt %, a stannic oxide content of 11.7 wt %, a diatomite content of 18.0 wt %, a nickel content of 15.1 wt %.

Comparative Example II-3

3.19 kg tin acetate (from the Aldrich company, AR, 99 wt %) under stirring was slowly added to 3.5 kg 5% hydrochloric acid (CP, from the Beijing Chemical Plant), after stirred for 1 hour, at this time the solution presented as a white sol.

4.93 kg zinc oxide powder (from the Headhorse company, having a purity of 99.7%), 2.15 kg diatomite (from the Global Mineral company, calculated on a dry basis as 2.10 kg), and 6.80 kg deionized water were mixed, and after stirred for 30 minutes, to obtain a slurry B. The slurry B was added to the white sol, and after stirred for 1 hour, to obtain a carrier slurry.

Following the procedure of Example II-1, the carrier slurry was spray dried and molded, and then introduced thereto active components nickel and cobalt, to obtain an adsorbing agent II-B3. The composition of the adsorbing agent II-B3 is: a zinc oxide content of 49.3 wt %, a stannic oxide content of 13.5 wt %, a diatomite content of 21.0 wt %, a nickel content of 8.1 wt %, a cobalt content of 8.1 wt %.

Comparative Example II-4

2.64 kg tin acetate (from the Aldrich company, AR, 99 wt %) under stirring was slowly added to 3.5 kg 5% hydrochloric acid (CP, from the Beijing Chemical Plant), after stirred for 1 hour, at this time the solution presented as a white sol.

5.52 kg zinc oxide powder (from the Headhorse company, having a purity of 99.7%), 2.44 kg kaolin (from the Suzhou Kaolin Factory, calculated on a dry basis as 1.80 kg), and 6.80 kg deionized water were mixed, and after stirred for 30 minutes, to obtain a slurry B. The slurry B was added to the white sol, and after stirred for 1 hour, to obtain a carrier slurry.

Following the procedure of Example II-1, the carrier slurry was spray dried and molded, and then introduced thereto the active component nickel, to obtain an adsorbing agent II-B4. The composition of the adsorbing agent II-B4 is: a zinc oxide content of 55.2 wt %, a stannic oxide content of 11.7 wt %, a kaolin content of 18.0 wt %, a nickel content of 15.1 wt %.

Example II-6

Each adsorbing agent produced as aforesaid was studied for the desulfurization performance and the octane number. The desulfurization performance was characterized by the sulfur content of the desulfurized product. The sulfur content of the desulfurized product was determined by an off-line chromatograph, evaluated on a fixed bed microreactor. The feed oil for the desulfurization reaction test was a catalytic cracking gasoline having a sulfur content of 640 ppm. The condition of the desulfurization reaction test was: under a hydrogen atmosphere, a reaction temperature of 410° C., a reaction pressure of 1.38 MPa, a ratio by molar of hydrogen to hydrocarbon oil of 0.35, a WHSV of 4 $hr^{-1}$. To accurately reflect the activity of the adsorbing agent in practice at an industrial scale, upon completion of the reaction, the adsorbing agent was regenerated at 550° C. under air atmosphere. The test runs were repeated for six cycles of reaction and regeneration, and then the adsorbing agent exhibits a substantially stable activity. The desulfurization performance of the adsorbing agent herein was characterized by the sulfur content of the product gasoline observed with this adsorbing agent exhibiting a substantially stable activity, which was listed in Table II-1. The product gasoline was weighted for calculation of the yield.

The Chinese national standards GB/T 503-1995 and GB/T 5487-1995 were respectively followed to determine the motor-method octane number (MON) and the research octane number (RON) of gasoline before and after the desulfurization reaction test. The results were given in Table II-1. As can be seen from Table II-1, by using an adsorbing agent comprising a molecular sieve having a BEA structure, the octane number of the product gasoline can be increased in each case.

TABLE II-1

| adsorbing agent | desulfurization performance and octane number | | | | | | | | |
|---|---|---|---|---|---|---|---|---|---|
| | II-A1 | II-A2 | II-A3 | II-A4 | II-A5 | II-B1 | II-B2 | II-B3 | II-B4 |
| sulfur content of the product gasoline/ppm | 12 | 6 | 11 | 7 | 13 | 12 | 7 | 13 | 8 |
| ΔMON | 0.50 | 0.10 | 0.30 | 0.05 | 0.40 | −0.50 | −0.35 | −0.45 | −0.35 |
| ΔRON | 0.40 | 0.10 | 0.30 | 0.05 | 0.40 | −0.50 | −0.35 | −0.35 | −0.35 |
| Δ(RON + MON)/2 | 0.45 | 0.10 | 0.30 | 0.05 | 0.40 | −0.50 | −0.35 | −0.40 | −0.35 |
| product gasoline yield/% | 99.8 | 99.9 | 99.9 | 99.9 | 99.8 | 99.8 | 99.9 | 99.8 | 99.9 |

Note:
1. The feed gasoline has a sulfur content of 640 ppm, a RON of 93.0, a MON of 82.7,
2. ΔMON represents the increment in the MON of the product,
3. ΔRON represents the increment in the RON of the product,
4. Δ(RON + MON)/2 represents the difference between the anti-knock index of the product and that of the feed.

Example III-1

The adsorbing agent was produced as follows: 1.90 kg zirconium tetrachloride (from the Beijing Chemical Plant, AR, 99 wt %) was slowly added to 2.7 kg 5 wt % nitric acid solution, and then stirred gently to avoid precipitation of zirconium oxide crystals, to obtain a colorless and transparent colloidal solution, called as zirconium sol. Then to the zirconium sol was added 2.10 kg expanded perlite (from the Global Mineral company, calculated on a dry basis as 2.06 kg) and then stirred and mixed till homogeneous, to obtain a slurry A.

4.43 kg zinc oxide powder (from the Headhorse company, having a purity of 99.7 wt %), 0.84 kg Beta-molecular sieve (from the Nanjing catalyst Division of the Sinopec, calculated on a dry basis as 0.70 kg), and 4.57 kg deionized water were mixed, and after stirred for 30 minutes, to obtain a slurry B. The slurry B was added to the slurry A, and after stirred for 1 hour, to obtain a carrier slurry.

The carrier slurry was spray dried by a spray drier of the MODEL Bowen Nozzle Tower™, at a spray drying pressure of 8.5 to 9.5 MPa, an entrance temperature of 500° C. or less, an exit temperature of about 150° C. The microspheres obtained from the spray drying was firstly dried at 180° C. for 1 hour, then at 635° C. calcinated for 1 hour, to obtain a carrier for the adsorbing agent.

3.2 kg of the carrier for the adsorbing agent was solution impregnated by 3.51 kg hexahydrated nickel nitrate (from the Beijing Chemical Reagent Company, having a purity of more than 98.5 wt %) in 0.6 kg deionized water, the resultant mixture was at 180° C. dried for 4 hours, and then under air atmosphere at 635° C. calcinated for 1 hour, to obtain a precursor of the adsorbing agent.

The precursor of the adsorbing agent was reduced at 425° C. under a hydrogen atmosphere for 2 hours, to obtain an adsorbing agent. The adsorbing agent was named as adsorbing agent III-A1. The composition of the adsorbing agent III-A1 is: a zinc oxide content of 44.3 wt %, an expanded perlite content of 20.6 wt %, a Beta-molecular sieve content of 7.0 wt %, zirconium oxide binder 10.0 wt %, a nickel content of 18.1 wt %.

Example III-2

1.71 kg zirconium oxychloride (from the Aldrich company, AR, 98.5 wt %) under stirring was slowly added to 3.2 kg 15 wt % hydrochloric acid (CP, from the Beijing Chemical Plant) and after stirred and acidated for 1 hour, at this time the solution presented as a colorless and transparent colloidal solution, called as zirconium sol. Then to the zirconium sol was added 1.54 kg diatomite (from the Global Mineral company, calculated on a dry basis as 1.50 kg) and then mixed under stirring, to obtain a slurry A.

5.52 kg zinc oxide powder (from the Headhorse company, having a purity of 99.7%), 0.36 kg Beta-molecular sieve (from the Nanjing catalyst Division of the Sinopec, calculated on a dry basis as 0.30 kg), and 5.0 kg deionized water were mixed and stirred for 30 minutes, to obtain a slurry B. The slurry B was added to the slurry A, and after stirred for 1 hour, to obtain a carrier slurry.

Following the procedure of Example III-1, the carrier slurry was spray dried and molded, and then introduced thereto the active component nickel, to obtain an adsorbing agent III-A2. The composition of the adsorbing agent III-A2 is: a zinc oxide content of 55.2 wt %, a zirconium oxide binder content of 11.7 wt %, a diatomite content of 15.0 wt %, a Beta-molecular sieve content of 3.0 wt %, a nickel content of 15.1 wt %.

Example III-3

The adsorbing agent was produced as follows: 1.76 kg zirconium hydroxide (from the Aldrich company, AR, 99 wt %) was added to 3.1 kg 30 wt % hydrochloric acid (CP, from the Beijing Chemical Plant) and after stirred and acidated for 1 hour, to obtain a transparent colloidal solution, called as zirconium sol.

4.93 kg zinc oxide powder (from the Headhorse company, having a purity of 99.7%), 1.64 kg diatomite (from the Global Mineral company, calculated on a dry basis as 1.60 kg), 0.56 kg USY molecular sieve (from the Qilu Catalyst Division of the Sinopec, calculated on a dry basis as 0.50 kg), and 6.40 kg deionized water were mixed, and after stirred for 30 minutes, to obtain a slurry B. The slurry B was added to the zirconium sol, and after stirred for 1 hour, to obtain a carrier slurry.

Following the procedure of Example III-1, the carrier slurry was spray dried and molded, and then introduced thereto active components nickel and cobalt, to obtain an adsorbing agent III-A3. The composition of the adsorbing agent III-A3 is: a zinc oxide content of 49.3 wt %, a zirconium oxide binder content of 13.5 wt %, a diatomite content of 16.0 wt %, a USY content of 5.0 wt %, a nickel content of 8.1 wt %, a cobalt content of 8.1 wt %.

Example III-4

The adsorbing agent was produced as follows: 1.53 kg zirconium hydroxide (from the Aldrich company, AR, 99 wt %) was added to 3.1 kg 30 wt % hydrochloric acid (CP, from the Beijing Chemical Plant) and after stirred and acidated for 1 hour, to obtain a transparent colloidal solution, called as zirconium sol.

5.52 kg zinc oxide powder (from the Headhorse company, having a purity of 99.7%), 2.03 kg kaolin (from the Suzhou Kaolin Factory, calculated on a dry basis as 1.50 kg), 0.36 kg X molecular sieve (from the Qilu Catalyst Division of the Sinopec, calculated on a dry basis as 0.30 kg), and 7.40 kg deionized water were mixed, and after stirred for 30 minutes, to obtain a slurry B. The slurry B was added to the zirconium sol, and after stirred for 1 hour, to obtain a carrier slurry.

Following the procedure of Example III-1, the carrier slurry was spray dried and molded, and then introduced thereto the active component nickel, to obtain an adsorbing agent III-A4. The composition of the adsorbing agent III-A4 is: a zinc oxide content of 55.2 wt %, a zirconium oxide binder content of 11.7 wt %, a kaolin content of 15.0 wt %, a X molecular sieve content of 3.0 wt %, a nickel content of 15.1 wt %.

Example III-5

The adsorbing agent was produced as follows: 1.90 kg zirconium tetrachloride (from the Beijing Chemical Plant, AR, 99 wt %) was slowly added to 2.7 kg 5 wt % nitric acid solution, and then stirred gently to avoid precipitation of zirconium oxide crystals, to obtain a colorless and transparent colloidal solution, called as zirconium sol. Then to the zirconium sol was added 2.10 kg expanded perlite (from the Global Mineral company, calculated on a dry basis as 2.06 kg) and then stirred and mixed till homogeneous, to obtain a slurry A.

4.43 kg zinc oxide powder (from the Headhorse company, having a purity of 99.7 wt %), 0.78 kg USY molecular sieve (from the Qilu Catalyst Division of the Sinopec, calculated on a dry basis as 0.70 kg), and 4.57 kg deionized water were mixed, and after stirred for 30 minutes, to obtain a slurry B. The slurry B was added to the slurry A, and after stirred for 1 hour, to obtain a carrier slurry.

Following the procedure of Example III-1, the carrier slurry was spray dried and molded, and then introduced thereto the active component nickel, to obtain an adsorbing agent III-A5. The composition of the adsorbing agent III-A5 is: a zinc oxide content of 44.3 wt %, an expanded perlite content of 20.6 wt %, a USY molecular sieve content of 7.0 wt %, zirconium oxide binder 10.0 wt %, a nickel content of 18.1 wt %.

Comparative Example III-1

The adsorbing agent was produced as follows: 2.58 kg zirconium tetrachloride (from the Beijing Chemical Plant, AR, 99 wt %) was slowly added to 4.2 kg 5 wt % nitric acid solution, and then stirred gently to avoid precipitation of zirconium oxide crystals, to obtain a colorless and transparent colloidal solution, called as zirconium sol. Then to the zirconium sol was added 2.45 kg expanded perlite (from the Global Mineral company, calculated on a dry basis as 2.40 kg) and then stirred and mixed till homogeneous, to obtain a slurry A.

4.43 kg zinc oxide powder (from the Headhorse company, having a purity of 99.7 wt %), and 4.57 kg deionized water were mixed, and after stirred for 30 minutes, to obtain a slurry B. The slurry B was added to the slurry A, and after stirred for 1 hour, to obtain a carrier slurry.

Following the procedure of Example III-1, the carrier slurry was spray dried and molded, and then introduced thereto the active component nickel, to obtain an adsorbing agent III-B1. The composition of the adsorbing agent III-B1 is: a zinc oxide content of 44.3 wt %, an expanded perlite content of 24.0 wt %, zirconium oxide binder 13.6 wt %, a nickel content of 18.1 wt %.

Comparative Example III-2

1.71 kg zirconium oxychloride (from the Aldrich company, AR, 98.5 wt %) under stirring was slowly added to 3.2 kg 15 wt % hydrochloric acid (CP, from the Beijing Chemical Plant) and after stirred and acidated for 1 hour, at this time the solution presented as a colorless and transparent colloidal solution, called as zirconium sol. Then to the zirconium sol was added 1.85 kg diatomite (from the Global Mineral company, calculated on a dry basis as 1.80 kg) and then mixed under stirring, to obtain a slurry A.

5.52 kg zinc oxide powder (from the Headhorse company, having a purity of 99.7%), and 5.0 kg deionized water were mixed and stirred for 30 minutes, to obtain a slurry B. The slurry B was added to the slurry A, and after stirred for 1 hour, to obtain a carrier slurry.

Following the procedure of Example III-1, the carrier slurry was spray dried and molded, and then introduced thereto the active component nickel, to obtain an adsorbing agent III-B2. The composition of the adsorbing agent III-B2 is: a zinc oxide content of 55.2 wt %, a zirconium oxide binder content of 11.7 wt %, a diatomite content of 18.0 wt %, a nickel content of 15.1 wt %.

Comparative Example III-3

The adsorbing agent was produced as follows: 1.76 kg zirconium hydroxide (from the Aldrich company, AR, 99 wt %) was added to 3.1 kg 30 wt % hydrochloric acid (CP, from the Beijing Chemical Plant) and after stirred and acidated for 1 hour, to obtain a transparent colloidal solution, called as zirconium sol.

4.93 kg zinc oxide powder (from the Headhorse company, having a purity of 99.7%), 2.15 kg diatomite (from the Global Mineral company, calculated on a dry basis as 2.10 kg), and 6.90 kg deionized water were mixed, and after stirred for 30 minutes, to obtain a slurry B. The slurry B was added to the zirconium sol, and after stirred for 1 hour, to obtain a carrier slurry.

Following the procedure of Example III-1, the carrier slurry was spray dried and molded, and then introduced thereto active components nickel and cobalt, to obtain an adsorbing agent III-B3. The composition of the adsorbing agent III-B3 is: a zinc oxide content of 49.3 wt %, a zirconium oxide binder content of 13.5 wt %, a diatomite content of 21.0 wt %, a nickel content of 8.1 wt %, a cobalt content of 8.1 wt %.

Comparative Example III-4

The adsorbing agent was produced as follows: 1.53 kg zirconium hydroxide (from the Aldrich company, AR, 99 wt %) was added to 3.1 kg 30 wt % hydrochloric acid (CP, from the Beijing Chemical Plant) and after stirred and acidated for 1 hour, to obtain a transparent colloidal solution, called as zirconium sol.

5.52 kg zinc oxide powder (from the Headhorse company, having a purity of 99.7%), 2.44 kg kaolin (from the Suzhou Kaolin Factory, calculated on a dry basis as 1.80 kg), and 7.40 kg deionized water were mixed, and after stirred for 30 minutes, to obtain a slurry B. The slurry B was added to the zirconium sol, and after stirred for 1 hour, to obtain a carrier slurry.

Following the procedure of Example III-1, the carrier slurry was spray dried and molded, and then introduced thereto the active component nickel, to obtain an adsorbing agent III-B4. The composition of the adsorbing agent III-B4 is: a zinc oxide content of 55.2 wt %, a zirconium oxide binder content of 11.7 wt %, a kaolin content of 18.0 wt %, a nickel content of 15.1 wt %.

Example III-6

Each adsorbing agent produced as aforesaid was studied for the desulfurization performance and the octane number. The desulfurization performance was characterized by the sulfur content of the desulfurized product. The sulfur content of the desulfurized product was determined by an off-line chromatograph, evaluated on a fixed bed microreactor. The feed oil for the desulfurization reaction test was a catalytic cracking gasoline having a sulfur content of 640 ppm. The condition of the desulfurization reaction test was: under a hydrogen atmosphere, a reaction temperature of 410° C., a reaction pressure of 1.38 MPa, a ratio by molar of hydrogen to hydrocarbon oil of 0.35, a WHSV of 4 $hr^{-1}$. To accurately reflect the activity of the adsorbing agent in practice at an industrial scale, upon completion of the reaction, the adsorbing agent was regenerated at 550° C. under air atmosphere. The test runs were repeated for six cycles of reaction and regeneration, and then the adsorbing agent exhibits a substantially stable activity. The desulfurization performance of the adsorbing agent herein was characterized by the sulfur content of the product gasoline observed with this adsorbing agent exhibiting a substantially stable activity, which was listed in Table III-1. The product gasoline was weighted for calculation of the yield.

The Chinese national standards GB/T 503-1995 and GB/T 5487-1995 were respectively followed to determine the motor-method octane number (MON) and the research octane number (RON) of gasoline before and after the desulfurization reaction test. The results were given in Table III-1. As can be seen from Table III-1, by using an adsorbing agent comprising a molecular sieve having a BEA structure, the octane number of the product gasoline can be increased in each case.

TABLE III-1

| desulfurization performance and octane number | | | | | | | | | |
|---|---|---|---|---|---|---|---|---|---|
| adsorbing agent | III-A1 | III-A2 | III-A3 | III-A4 | III-A5 | III-B1 | III-B2 | III-B3 | III-B4 |
| sulfur content of the product gasoline/ppm | 8 | 4 | 10 | 5 | 10 | 10 | 6 | 12 | 7 |
| ΔMON | 0.45 | 0 | 0.30 | 0.05 | 0.50 | −0.50 | −0.35 | −0.45 | −0.4 |
| ΔRON | 0.45 | 0.1 | 0.40 | 0.05 | 0.50 | −0.50 | −0.35 | −0.45 | −0.3 |
| Δ(RON + MON)/2 | 0.45 | 0.05 | 0.35 | 0.05 | 0.45 | −0.50 | −0.35 | −0.45 | −0.35 |
| product gasoline yield/% | 99.8 | 99.9 | 99.8 | 99.9 | 99.8 | 99.8 | 99.9 | 99.8 | 99.9 |

Note:
1. The feed gasoline has a sulfur content of 640 ppm, a RON of 93.0, a MON of 82.7,
2. ΔMON represents the increment in the MON of the product,
3. ΔRON represents the increment in the RON of the product,
4. Δ(RON + MON)/2 represents the difference between the anti-knock index of the product and that of the feed.

Example IV-1

4.43 kg zinc oxide powder (from the Headhorse company, having a purity of 99.7 wt %), 0.84 kg Beta-molecular sieve (from the Nanjing catalyst Division of the Sinopec, calculated on a dry basis as 0.70 kg), and 4.57 kg deionized water were mixed, and after stirred for 30 minutes, to obtain a slurry A.

1.37 kg alumina (from the Shandong Aluminium Plant, calculated on a dry basis as 1.00 kg), and 2.10 kg expanded perlite (from the Global Mineral company, calculated on a dry basis as 2.06 kg) were mixed under stirring, and then introduced thereto 4.6 kg deionized water, after mixed till homogeneous, introduced thereto 360 ml 30 wt % hydrochloric acid (CP, from the Beijing Chemical Plant), after stirred and acidated for 1 hour, heated to 80° C. and aged for 2 hours, further introduced thereto the slurry A, and then mixed and stirred for 1 hour, to obtain a carrier slurry.

The carrier slurry was spray dried by a spray drier of the MODEL Bowen Nozzle Tower™, at a spray drying pressure of 8.5 to 9.5 MPa, an entrance temperature of 500° C. or less, an exit temperature of about 150° C. The microspheres obtained from the spray drying was firstly dried at 180° C. for 1 hour, then at 635° C. calcinated for 1 hour, to obtain a carrier for the adsorbing agent.

3.2 kg of the carrier for the adsorbing agent was solution impregnated by 3.51 kg hexahydrated nickel nitrate (from the Beijing Chemical Reagent Company, having a purity of more than 98.5%) in 0.6 kg deionized water, the resultant mixture was at 180° C. dried for 4 hours, and then under air atmosphere at 635° C. calcinated for 1 hour, to obtain a precursor of the adsorbing agent.

The precursor of the adsorbing agent was reduced at 425° C. under a hydrogen atmosphere for 2 hours, to obtain an adsorbing agent. The adsorbing agent was named as adsorbing agent IV-A1. The composition of the adsorbing agent IV-A1 is: a zinc oxide content of 44.3 wt %, an expanded perlite content of 20.6 wt %, a Beta-molecular sieve content of 7.0 wt %, an alumina binder content of 10.0 wt %, a nickel content of 18.1 wt %.

Comparative Example IV-1

The adsorbing agent was produced as follows: 4.43 kg zinc oxide powder (from the Headhorse company, having a purity of 99.7%), and 4.57 kg deionized water were mixed, and after stirred for 30 minutes, to obtain a zinc oxide slurry.

1.87 kg alumina (from the Shandong Aluminium Plant, calculated on a dry basis as 1.36 kg), and 2.46 kg expanded perlite (from the Global Mineral company, calculated on a dry basis as 2.40 kg) were mixed under stirring, and then introduced thereto 4.6 kg deionized water, after mixed till homogeneous, introduced thereto 360 ml 30% hydrochloric acid (CP, from the Beijing Chemical Plant), after acidated under stirring for 1 hour, heated to 80° C. and aged for 2 hours, further introduced thereto the zinc oxide slurry, and then mixed and stirred for 1 hour, to obtain a carrier slurry.

Following the procedure of Example IV-1, the carrier slurry was spray dried and molded, and then introduced thereto the active component nickel, to obtain an adsorbing agent IV-B1. The composition of the adsorbing agent IV-B1 is: a zinc oxide content of 44.3 wt %, an alumina binder content of 13.6 wt %, an expanded perlite content of 24.0 wt %, a nickel content of 18.1 wt %.

Example IV-2

1.61 kg pseudo boehmite (from the Shandong Aluminium Plant, calculated on a dry basis as 1.17 kg), and 1.54 kg diatomite (from the Global Mineral company, calculated on a dry basis as 1.50 kg) were mixed under stirring, and then introduced thereto 8.2 kg deionized water, after mixed till homogeneous, introduced thereto 260 ml 30% hydrochloric acid (CP, from the Beijing Chemical Plant), after acidated under stirring for 1 hour, heated to 80° C. and aged for 2 hours, after cooled, further introduced thereto 5.52 kg zinc oxide powder (from the Headhorse company, having a purity of 99.7%), and 0.36 kg Beta-molecular sieve (from the Nanjing catalyst Division of the Sinopec, calculated on a dry basis as 0.30 kg), after stirred for 1 hour, to obtain a carrier slurry.

Following the procedure of Example IV-1, the carrier slurry was spray dried and molded, and then introduced thereto the active component nickel, to obtain an adsorbing agent IV-A2. The composition of the adsorbing agent IV-A2 is: a zinc oxide content of 55.2 wt %, an alumina binder content of 11.7 wt %, a diatomite content of 15.0 wt %, a Beta-molecular sieve content of 3.0 wt %, a nickel content of 15.1 wt %.

Comparative Example IV-2

1.61 kg pseudo boehmite (from the Shandong Aluminium Plant, calculated on a dry basis as 1.17 kg), and 1.85 kg diatomite (from the Global Mineral company, calculated on a dry basis as 1.80 kg) were mixed under stirring, and then introduced thereto 8.2 kg deionized water, after mixed till homogeneous, introduced thereto 260 ml 30% hydrochloric acid (CP, from the Beijing Chemical Plant), after acidated under stirring for 1 hour, heated to 80° C. and aged for 2 hours, after cooled, further introduced thereto 5.52 kg zinc oxide powder (from the Headhorse company, having a purity of 99.7%) and after stirred for 1 hour, to obtain a carrier slurry.

Following the procedure of Example IV-1, the carrier slurry was spray dried and molded, and then introduced thereto the active component nickel, to obtain an adsorbing agent IV-B2. The composition of the adsorbing agent IV-B2 is: a zinc oxide content of 55.2 wt %, an alumina binder content of 11.7 wt %, a diatomite content of 18.0 wt %, a nickel content of 15.1 wt %.

Example IV-3

The adsorbing agent was produced as follows: 4.93 kg zinc oxide powder (from the Headhorse company, having a purity of 99.7%), 0.56 kg USY molecular sieve (from the Qilu Catalyst Division of the Sinopec, calculated on a dry basis as 0.50 kg), and 5.57 kg deionized water were mixed, and after stirred for 30 minutes, to obtain a slurry A.

1.85 kg pseudo boehmite (from the Shandong Aluminium Plant, calculated on a dry basis as 1.35 kg), and 1.64 kg diatomite (from the Global Mineral company, calculated on a dry basis as 1.60 kg) were mixed under stirring, and then introduced thereto 4.6 kg deionized water, after mixed till homogeneous, introduced thereto 300 ml 30% hydrochloric acid (CP, from the Beijing Chemical Plant) to have a slurry having a pH of 2.5, after acidated under stirring for 1 hour, heated to 80° C. and aged for 2 hours, further introduced thereto the slurry A, and then mixed and stirred for 1 hour, to obtain a carrier slurry.

Following the procedure of Example IV-1, the carrier slurry was spray dried and molded, and then introduced thereto active components nickel and cobalt, to obtain an adsorbing agent IV-A3. The composition of the adsorbing agent IV-A3 is: a zinc oxide content of 49.3 wt %, an alumina binder content of 13.5 wt %, a diatomite content of 16.0 wt %, a USY content of 5.0 wt %, a nickel content of 8.1 wt %, a cobalt content of 8.1 wt %.

Comparative Example IV-3

The adsorbing agent was produced as follows: 4.93 kg zinc oxide powder (from the Headhorse company, having a purity of 99.7%), and 5.57 kg deionized water were mixed, and after stirred for 30 minutes, to obtain a zinc oxide slurry.

1.85 kg pseudo boehmite (from the Shandong Aluminium Plant, calculated on a dry basis as 1.35 kg), and 2.16 kg diatomite (from the Global Mineral company, calculated on a dry basis as 2.10 kg) were mixed under stirring, and then introduced thereto 4.6 kg deionized water, after mixed till homogeneous, introduced thereto 300 ml 30% hydrochloric acid (CP, from the Beijing Chemical Plant) to have a slurry having a pH of 2.5, after acidated under stirring for 1 hour, heated to 80° C. and aged for 2 hours, further introduced thereto the zinc oxide slurry, and then mixed and stirred for 1 hour, to obtain a carrier slurry.

Following the procedure of Example IV-1, the carrier slurry was spray dried and molded, and then introduced thereto active components nickel and cobalt, to obtain an adsorbing agent IV-B3. The composition of the adsorbing agent IV-B3 is: a zinc oxide content of 49.3 wt %, an alumina binder content of 13.5 wt %, a diatomite content of 21.0 wt %, a nickel content of 8.1 wt %, a cobalt content of 8.1 wt %.

Example IV-4

The adsorbing agent was produced as follows: 5.52 kg zinc oxide powder (from the Headhorse company, having a purity of 99.7%), 0.36 kg X molecular sieve (from the Qilu Catalyst Division of the Sinopec, calculated on a dry basis as 0.30 kg), and 5.57 kg deionized water were mixed, and after stirred for 30 minutes, to obtain a slurry A.

1.61 kg pseudo boehmite (from the Shandong Aluminium Plant, calculated on a dry basis as 1.17 kg), and 2.03 kg kaolin (from the Suzhou Kaolin Factory, calculated on a dry basis as 1.50 kg) were mixed under stirring, and then introduced thereto 4.6 kg deionized water, after mixed till homogeneous, introduced thereto 300 ml 30% hydrochloric acid (CP, from the Beijing Chemical Plant) to have a slurry having a pH of 2.5, after acidated under stirring for 1 hour, heated to 80° C. and aged for 2 hours, further introduced thereto the slurry A, and then mixed and stirred for 1 hour, to obtain a carrier slurry.

Following the procedure of Example IV-1, the carrier slurry was spray dried and molded, and then introduced thereto the active component nickel, to obtain an adsorbing agent IV-A4. The composition of the adsorbing agent IV-A4 is: a zinc oxide content of 55.2 wt %, an alumina binder content of 11.7 wt %, a kaolin content of 15.0 wt %, a X molecular sieve content of 3.0 wt %, a nickel content of 15.1 wt %.

Comparative Example IV-4

The adsorbing agent was produced as follows: 5.52 kg zinc oxide powder (from the Headhorse company, having a purity of 99.7%), and 5.57 kg deionized water were mixed, and after stirred for 30 minutes, to obtain a zinc oxide slurry.

1.61 kg pseudo boehmite (from the Shandong Aluminium Plant, calculated on a dry basis as 1.17 kg), and 2.44 kg kaolin (from the Suzhou Kaolin Factory, calculated on a dry basis as 1.80 kg) were mixed under stirring, and then introduced thereto 3.6 kg deionized water, after mixed till homogeneous, introduced thereto 300 ml 30% hydrochloric acid (CP, from the Beijing Chemical Plant) to have a slurry having a pH of 2.5, after acidated under stirring for 1 hour, heated to 80° C. and aged for 2 hours, further introduced thereto the zinc oxide slurry, and then mixed and stirred for 1 hour, to obtain a carrier slurry.

Following the procedure of Example IV-1, the carrier slurry was spray dried and molded, and then introduced thereto the active component nickel, to obtain an adsorbing agent IV-B4. The composition of the adsorbing agent IV-B4 is: a zinc oxide content of 55.2 wt %, an alumina binder content of 11.7 wt %, a kaolin content of 18.0 wt %, a nickel content of 15.1 wt %.

Example IV-5

4.43 kg zinc oxide powder (from the Headhorse company, having a purity of 99.7 wt %), 0.78 kg USY molecular sieve (from the Qilu Catalyst Division of the Sinopec, calculated on a dry basis as 0.70 kg), and 4.57 kg deionized water were mixed, and after stirred for 30 minutes, to obtain a slurry A.

1.37 kg alumina (from the Shandong Aluminium Plant, calculated on a dry basis as 1.00 kg), and 2.10 kg expanded perlite (from the Global Mineral company, calculated on a dry basis as 2.06 kg) were mixed under stirring, and then introduced thereto 4.6 kg deionized water, after mixed till homogeneous, introduced thereto 360 ml 30 wt % hydrochloric acid (CP, from the Beijing Chemical Plant), after acidated under stirring for 1 hour, heated to 80° C. and aged for 2 hours, further introduced thereto the slurry A, and then mixed and stirred for 1 hour, to obtain a carrier slurry.

Following the procedure of Example IV-1, the carrier slurry was spray dried and molded, and then introduced thereto the active component nickel, to obtain an adsorbing agent IV-A5. The composition of the adsorbing agent IV-A5 is: a zinc oxide content of 44.3 wt %, an expanded perlite content of 20.6 wt %, a USY molecular sieve content of 7.0 wt %, an alumina binder content of 10.0 wt %, a nickel content of 18.1 wt %.

Example IV-6

Each adsorbing agent produced as aforesaid was studied for the desulfurization performance and the octane number. The desulfurization performance was characterized by the sulfur content of the desulfurized product. The sulfur content of the desulfurized product was determined by an off-line chromatograph, evaluated on a fixed bed microreactor. The feed oil for the desulfurization reaction test was a catalytic cracking gasoline having a sulfur content of 640 ppm. The condition of the desulfurization reaction test was: under a hydrogen atmosphere, a reaction temperature of 410° C., a reaction pressure of 1.38 MPa, a ratio by molar of hydrogen to hydrocarbon oil of 0.35, a WHSV of 4 hr$^{-1}$. To accurately reflect the activity of the adsorbing agent in practice at an industrial scale, upon completion of the reaction, the adsorbing agent was regenerated at 550° C. under air atmosphere. The test runs were repeated for six cycles of reaction and regeneration, and then the adsorbing agent exhibits a substantially stable activity. The desulfurization performance of the adsorbing agent herein was characterized by the sulfur content of the product gasoline observed with this adsorbing agent exhibiting a substantially stable activity, which was listed in Table IV-1. The product gasoline was weighted for calculation of the yield.

The Chinese national standards GB/T 503-1995 and GB/T 5487-1995 were respectively followed to determine the motor-method octane number (MON) and the research octane number (RON) of gasoline before and after the desulfurization reaction test. The results were given in Table IV-1. As can be seen from Table IV-1, by using an adsorbing agent comprising a molecular sieve having a BEA structure, the octane number of the product gasoline can be increased in each case.

TABLE IV-1 desulfurization performance and octane number

| adsorbing agent | IV-A1 | IV-B1 | IV-A2 | IV-B2 | IV-A3 | IV-B3 | IV-A4 | IV-B4 | IV-A5 |
|---|---|---|---|---|---|---|---|---|---|
| sulfur content of the product gasoline/ppm | 20 | 20 | 12 | 13 | 21 | 22 | 15 | 15 | 18 |
| ΔMON | 0.40 | −0.60 | 0.10 | −0.45 | 0.35 | −0.55 | 0.15 | −0.45 | 0.40 |
| ΔRON | 0.50 | −0.50 | 0.10 | −0.35 | 0.25 | −0.45 | 0.05 | −0.35 | 0.40 |
| Δ(RON + MON)/2 | 0.45 | −0.55 | 0.10 | −0.40 | 0.30 | −0.50 | 0.10 | −0.40 | 0.40 |
| product gasoline yield/% | 99.9 | 99.9 | 99.9 | 99.8 | 99.8 | 99.8 | 99.9 | 99.9 | 99.9 |

Note:
1. The feed gasoline has a sulfur content of 640 ppm, a RON of 93.0, a MON of 82.7,
2. ΔMON represents the increment in the MON of the product,
3. ΔRON represents the increment in the RON of the product,
4. Δ(RON + MON)/2 represents the difference between the anti-knock index of the product and that of the feed.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A process for producing a desulfurization adsorbing agent for hydrocarbon oil, comprising:
   (1) contacting at least one binder selected from the group consisting of titanium dioxide, stannic oxide, zirconium oxide and alumina with a silica source, a Si—Al molecular sieve having a BEA structure and zinc oxide, to obtain a carrier,
   (2) contacting the carrier with a promoter metal-containing compound, to obtain a precursor of the adsorbing agent, and
   (3) under a condition sufficient to present at least 10 wt % of the promoter metal in a reduced valence state, treating the precursor of the adsorbing agent, to obtain the desulfurization adsorbing agent for hydrocarbon oil,
   wherein the step (1) further comprises:
   (1a) mixing the binder or a binder precursor with an acid to form a slurry, and
   (1b) mixing the slurry, the silica source, the Si—Al molecular sieve having a BEA structure and zinc oxide to form a mixture and subject the mixture to molding, drying, and calcination to obtain the carrier,
   wherein the desulfurization adsorbing agent comprises:
   1) a Si—Al molecular sieve having a BEA structure:
   2) at least one binder selected from the group consisting of titanium dioxide, stannic oxide, zirconium oxide and alumina;
   3) a silica source;
   4) zinc oxide; and
   5) at least one promoter metal selected from the group consisting of cobalt, nickel, iron and manganese, based on the metal, wherein at least 10 wt % of the promoter metal is present in a reduced valence state, and
   wherein the Si—Al molecular sieve is in an amount of 2-15 wt %, the binder is in an amount of 5-25 wt %, the silica source is in an amount of 10-30 wt %, zinc oxide is in an amount of 25-70 wt %, and the promoter metal is in an amount of 8-25 wt %, all based on a total weight of the desulfurization absorbing agent.

2. The process according to claim 1, wherein the binder precursor is at least one selected from the group consisting of halides, alkoxylates, carboxylic acid salts, hydrated oxides, hydroxides, hydrated hydroxides and oxyhalides, of titanium, tin, zirconium, and aluminum.

3. The process according to claim 1, wherein the acid is at least one selected from the group consisting of a water soluble inorganic acid and a water soluble organic acid, and the amount of the acid to be used is such that the pH value of the slurry reaches 0.5-6.

4. The process according to claim 1, wherein, in the desulfurization absorbing agent, the Si—Al molecular sieve having a BEA structure is in an amount of 2-10 wt %, the binder is in an amount of 8-15 wt %, the silica source is in an amount of 12-25 wt %, the zinc oxide is in an amount of 40-60 wt %, the promoter metal is in an amount of 12-20 wt %.

5. The process according to claim 1, wherein, in the desulfurization absorbing agent, the silica source is selected from the group consisting of silica or a natural mineral having a silica content of more than 45 wt %.

6. The process according to claim 1, wherein, in the desulfurization absorbing agent, the Si—Al molecular sieve having a BEA structure is a Beta-molecular sieve.

7. A process for producing a desulfurization adsorbing agent for hydrocarbon oil, comprising:
(1) contacting at least one binder selected from the group consisting of titanium dioxide, stannic oxide, zirconium oxide and alumina with a silica source, a Si—Al molecular sieve having a BEA structure and zinc oxide, to obtain a carrier;
(2) contacting the carrier with a promoter metal-containing compound, to obtain a precursor of the adsorbing agent; and
(3) under a condition sufficient to present at least 10 wt % of the promoter metal in a reduced valence state, treating the precursor of the adsorbing agent, to obtain the desulfurization adsorbing agent for hydrocarbon oil,
wherein the step (1) further comprises:
(1a') mixing at least a part of the silica source and the binder or a binder precursor with an acid to form a slurry, and
(1b') mixing the slurry, the rest part of the silica source, the Si—Al molecular sieve having a BEA structure and zinc oxide to form a mixture and subject the mixture to molding, drying, and calcination to obtain the carrier,
wherein the desulfurization adsorbing agent comprises:
1) a Si—Al molecular sieve having a BEA structure:
2) at least one binder selected from the group consisting of titanium dioxide, stannic oxide, zirconium oxide and alumina;
3) a silica source;
4) zinc oxide; and
5) at least one promoter metal selected from the group consisting of cobalt, nickel, iron and manganese, based on the metal, wherein at least 10 wt % of the promoter metal is present in a reduced valence state, and
wherein the Si—Al molecular sieve is in an amount of 2-15 wt %, the binder is in an amount of 5-25 wt %, the silica source is in an amount of 10-30 wt %, zinc oxide is in an amount of 25-70 wt %, and the promoter metal is in an amount of 8-25 wt %, all based on a total weight of the desulfurization absorbing agent.

8. The process according to claim 7, wherein the binder precursor is at least one selected from the group consisting of halides, alkoxylates, carboxylic acid salts, hydrated oxides, hydroxides, hydrated hydroxides and oxyhalides, of titanium, tin, zirconium, and aluminum.

9. The process according to claim 7, wherein the acid is at least one selected from the group consisting of a water soluble inorganic acid and a water soluble organic acid, and the amount of the acid to be used is such that the pH value of the slurry reaches 0.5-6.

10. The process according to claim 7, wherein, in the desulfurization absorbing agent, the Si—Al molecular sieve having a BEA structure is in an amount of 2-10 wt %, the binder is in an amount of 8-15 wt %, the silica source is in an amount of 12-25 wt %, the zinc oxide is in an amount of 40-60 wt %, the promoter metal is in an amount of 12-20 wt %.

11. The process according to claim 7, wherein, in the desulfurization absorbing agent, the silica source is selected from the group consisting of silica or a natural mineral having a silica content of more than 45 wt %.

12. The process according to claim 7, wherein, in the desulfurization absorbing agent, the Si—Al molecular sieve having a BEA structure is a Beta-molecular sieve.

* * * * *